United States Patent
Webster

(10) Patent No.: US 12,427,442 B2
(45) Date of Patent: Sep. 30, 2025

(54) SEPARATOR FOR A FLUID STREAM AND METHOD THEREIN

(71) Applicant: Steven Gregory Webster, New South Wales (AU)

(72) Inventor: Steven Gregory Webster, New South Wales (AU)

( * ) Notice: Subject to any disclaimer, the term of this patent is extended or adjusted under 35 U.S.C. 154(b) by 520 days.

(21) Appl. No.: 17/841,220

(22) Filed: Jun. 15, 2022

(65) Prior Publication Data
US 2022/0305407 A1    Sep. 29, 2022

Related U.S. Application Data

(63) Continuation of application No. PCT/AU2020/051380, filed on Dec. 16, 2020.

(30) Foreign Application Priority Data

Dec. 16, 2019  (AU) .................................. 2019904747

(51) Int. Cl.
   *B01D 19/00*      (2006.01)
(52) U.S. Cl.
   CPC ..... *B01D 19/0063* (2013.01); *B01D 19/0042* (2013.01); *B01D 2221/04* (2013.01)
(58) Field of Classification Search
   None
   See application file for complete search history.

(56) References Cited

U.S. PATENT DOCUMENTS

| | | | |
|---|---|---|---|
| 8,771,394 B2 * | 7/2014 | Skofteland | F04D 31/00 55/447 |
| 11,035,215 B2 * | 6/2021 | Kunkel | B01D 19/0063 |
| 2011/0203460 A1 * | 8/2011 | Skofteland | E21B 43/35 55/282 |

(Continued)

FOREIGN PATENT DOCUMENTS

| | | | |
|---|---|---|---|
| CN | 102537654 A | * | 7/2012 |
| CN | 104989448 A | * | 10/2015 |

(Continued)

OTHER PUBLICATIONS

International Preliminary Report on Patentability for International Application No. PCT/AU2020/051380 dated May 17, 2022.

(Continued)

*Primary Examiner* — Brit E. Anbacht
(74) *Attorney, Agent, or Firm* — Stephen J. Kenny; Nicole A. Bustos-Pomerantz; Foley Hoag LLP

(57) ABSTRACT

Disclose is a separator for separating liquid from a fluid stream including a mixture of gas and liquid. The separator comprises a first vessel including an outlet and an inlet for receiving the fluid stream, the first vessel in fluid communication with a second vessel via a first valve, the second vessel in fluid communication with a liquid outlet via a second valve, wherein the first vessel is arranged to enable the liquid to flow into the second vessel. The separator also has a second valve for controlling release of liquid from the second vessel, the first and second valves being pneumatically operated, the pneumatic operation of the first and second valves allowing only one of the first and second valves to be open during operation of the separator.

17 Claims, 14 Drawing Sheets

(56) References Cited

U.S. PATENT DOCUMENTS

| | | | | |
|---|---|---|---|---|
| 2015/0224438 A1* | 8/2015 | Brinkmann | ........ | B01D 53/0454 |
| | | | | 95/21 |
| 2016/0001792 A1* | 1/2016 | Gibney | ................ | B61D 39/001 |
| | | | | 105/377.06 |
| 2016/0096131 A1* | 4/2016 | Jones | ................... | B01D 46/446 |
| | | | | 96/333 |
| 2016/0302352 A1* | 10/2016 | Tramp | ...................... | A01C 1/06 |
| 2017/0067320 A1* | 3/2017 | Zouhair | ................. | E21B 3/022 |
| 2021/0205735 A1* | 7/2021 | Coombe | ................. | E21B 43/35 |
| 2024/0271493 A1* | 8/2024 | Begnaud | ............... | E21B 17/026 |
| 2024/0426396 A1* | 12/2024 | Krug | ................... | F16K 37/0091 |

FOREIGN PATENT DOCUMENTS

| | | | | |
|---|---|---|---|---|
| CN | 109083680 A | * | 12/2018 | .............. E21F 16/00 |
| WO | WO-2021/119740 A1 | | 6/2021 | |

OTHER PUBLICATIONS

International Search Report and Written Opinion for International Application No. PCT/AU2020/051380 dated Jan. 12, 2021.

\* cited by examiner

SEPARATOR FOR A FLUID STREAM AND METHOD THEREIN

CROSS REFERENCE TO RELATED APPLICATIONS

This application is a Continuation of and claims the benefit of priority to PCT/AU2020/051380 filed Dec. 16, 2020; which claims the benefit of priority to Australian Patent Application No. 2019904747 filed Dec. 16, 2019, the entirety of which is incorporated by reference herein.

TECHNICAL FIELD

The present invention generally relates to a device and method for separating a liquid from a fluid stream, the fluid stream including a mixture of gas and liquid.

BACKGROUND

Within many industrial processes, there is a need to separate liquids from gases. For example, such processes may include oil refineries, natural-gas processing plants, petrochemical and chemical plants, refrigeration systems, air conditioning systems, compressor systems, gas pipelines and the like. In such processes, gravity is utilized in a vessel to cause the liquid to settle to the bottom of the vessel, where it is withdrawn. This process is only effective as long as there is an air space inside the chamber, where failure can occur if either the mixed inlet is overwhelmed with the mixture of liquid and gas material, or the liquid drain is unable to handle the volume of liquid being collected.

By way of a non-limiting example only, one such industrial process where gasses need to be separated from other suspended media is degasifying coal seams. Coal seams commonly include gasses, such as carbon dioxide and methane, where these gasses are formed within the seam or are trapped by the surrounding layers of strata. Such gasses are commonly dangerous to the mine workers within the mine, as carbon dioxide is toxic and methane is extremely flammable.

At various points during the coal mining process, it is common to undertaking gas drainage of a coal seam to remove and capture those gasses to make it safe for mine workers and continued mine operation. During the gas drainage process, or degasification process, the captured gasses are commonly drained along with a volume of liquid that is present or proximate to the coal seam. The liquid may include groundwater, slurries of liquid and particulates, and other such liquids.

Once collected, the mixture of gasses and liquid needs to be separated into its component parts so that the dangerous gasses can be transported above ground for further processing and/or safe disposal and the liquid can be disposed or recycled. Current liquid and gas separators typically include a single vessel for receiving the mixture of liquid and gas, the vessel including a manually operated drain valve at the bottom of the vessel and a gas outlet connected to a suction line. As such, an operator is required to manually drain the separators regularly.

However, current systems are provided no fail-safes if the operator does not drain the liquid and gas separators regularly enough. For example, if the valve is not opened, the separator fills with liquid until the vessel overflows and the liquid runs up the suction line, cutting off the extraction of the gas. If the operator leaves the valve open and unattended, the all of the liquid drains out of the vessel and the gas is permitted to escape into the surrounding area, which provides an extremely hazardous environment for nearby workers. Similar risks are found in oil refineries, natural-gas processing plants, petrochemical and chemical plants, refrigeration systems, air conditioning systems, compressor systems, gas pipelines and the like.

Current separator systems used in the above-described industrial processes may attempt to address this risk of human error by using electrical control signals and solenoids to control the operation of the valve to control the drainage of liquid. However, in many industrial processes and operations, like coal mining, chemical and gas processing plants or piping, the use of such electrical signals and components is limited with extreme measures of control and protection against the risk of a spark causing a fire or explosion, which comes at a high financial cost. Further, some of these industrial processes that are high in methane and other highly flammable gases to the level where the industrial plant or mine may prohibit any electrical systems proximate to the separator.

Moreover, in the case of gas drainage during the initial phase of a cut or during exploratory mining, it is common for the drainage to take place in remote areas of the mine where electricity is not available.

The preferred embodiments of the present invention seek to address one or more of these disadvantages, and/or to at least provide the public with a useful alternative.

The reference in this specification to any prior publication (or information derived from the prior publication), or to any matter which is known, is not, and should not be taken as an acknowledgment or admission or any form of suggestion that the prior publication (or information derived from the prior publication) or known matter forms liner of the common general knowledge in the field of endeavour to which this specification relates.

SUMMARY

This Summary is provided to introduce a selection of concepts in a simplified form that are further described below in the Detailed Description. This Summary is not intended to identify essential features of the claimed subject matter, nor is it intended to be used to limit the scope of the claimed subject matter.

In a first embodiment, there is provided a separator for separating liquid from a fluid stream including a mixture of gas and liquid, comprising; a first vessel including an outlet and an inlet for receiving the fluid stream, said first vessel in fluid communication with a second vessel via a first valve, the second vessel in fluid communication with a liquid outlet via a second valve, wherein the first vessel is arranged to enable the liquid to flow into the second vessel; and a second valve for controlling release of liquid from the second vessel, the first and second valves being pneumatically operated, the pneumatic operation of the first and second valves allowing only one of the first and second valves to be open during operation of the separator.

In an embodiment, the separator is arranged in a first state, where the first valve is open and the second valve is closed.

In an embodiment, the separator is arranged in a second state, where the second valve is open and the first valve is closed.

In an embodiment, the second vessel includes a liquid sensor arranged to detect an upper threshold of liquid and a lower threshold of liquid in the second vessel.

In an embodiment, the liquid sensor is arranged to close the first valve upon detection of the upper threshold of liquid.

In an embodiment, the first valve includes a first valve sensor, wherein the first valve sensor is arranged to detect when the first valve is fully closed and send a signal to open the second valve.

In an embodiment, the liquid sensor is arranged to close the second valve upon detection of the lower threshold of liquid.

In an embodiment, the second valve includes a second valve sensor, wherein the second valve sensor is arranged to detect when the second valve is fully closed and send a signal to open the first valve.

In an embodiment, the liquid sensor includes a float sensor.

In an embodiment, the liquid sensor operates a switch, where the switch is arranged to control a pneumatic control valve.

In an embodiment, the pneumatic control valve is arranged in pneumatic connection with a first pneumatic cylinder arranged to articulate the first valve and wherein the pneumatic control valve is also arranged in pneumatic connection with a second pneumatic cylinder arranged to articulate the second valve In an embodiment, upon detection of the upper threshold volume, the pneumatic control valve controls a pneumatic pressure in a first direction to move the separator from the first state to the second state.

In an embodiment, upon detection of the lower threshold volume, the pneumatic control valve controls the pneumatic pressure of air in a second direction such that the separator moves from the second state to the first state.

In an embodiment, the first direction of pneumatic pressure is opposite to the second direction of pneumatic pressure.

In an embodiment, the separator further includes a third valve arranged to locate between the first vessel and the outlet.

In an embodiment, the first vessel includes a pressure sensor in connection with a third pneumatic cylinder arranged to articulate the third valve, such that upon the pressure sensor detecting a pressure outside a desired pressure range, the third pneumatic cylinder closes the third valve.

In an embodiment, the third valve is a pneumatically operated valve selected from the group consisting of a knifegate valve, a ball valve and a butterfly valve.

In an embodiment, the third valve includes a bias mechanism to bias the third valve closed in the event of a loss of pneumatic pressure.

In an embodiment, the first vessel includes at least one nozzle, the at least one nozzle being arranged to receive the fluid stream from the inlet and direct the fluid stream into the first vessel.

In an embodiment, the fluid stream enters the at least one nozzle includes a 90 degree bend portion.

In an embodiment, flow of the fluid stream enters the at least one nozzle includes a straight portion.

In an embodiment, the separator further includes a fourth valve arranged to locate between the first vessel and the inlet.

In an embodiment, the fourth valve is a pneumatically operated valve selected from the group consisting of a knifegate valve, a ball valve and a butterfly valve.

In an embodiment, the fourth valve includes a bias mechanism to bias the fourth valve closed in the event of a loss of pneumatic pressure.

In an embodiment, the first vessel is arranged above the second vessel.

In an embodiment, the first vessel is arranged adjacent to the second vessel.

In an embodiment, the first vessel and the second vessel are elongate shaped.

In an embodiment, the first vessel is elongate in a substantially vertical direction and the second vessel is elongate in a substantially horizontal direction.

In an embodiment, the first vessel is elongate in a substantially horizontal direction and the second vessel is elongate in a substantially vertical direction.

In an embodiment, the first vessel is cylindrically shaped at a first end includes a tapered second end, the second end being in fluid connection with the second vessel via the first valve.

In an embodiment, the second vessel is cylindrically shaped and the second valve is arranged to locate at either a first end or a second end of the second vessel.

In an embodiment, each of the first valve and the second valve are a pneumatically operated valve selected from the group consisting of a knifegate valve, a ball valve and a butterfly valve.

In an embodiment, the first valve includes a first pneumatic cylinder arranged to articulate the first valve, the first pneumatic cylinder arranged to bias the first valve in a closed position.

In an embodiment, the first valve and the second valve each include a bias mechanism to respectively bias the first valve and the second valve closed in the event of a loss of pneumatic pressure.

In an embodiment, the second vessel includes a base frame.

In an embodiment, the base frame includes two or more engagement portions

In an embodiment, the pneumatic control valve is in connection with an air compressor providing pneumatic pressure to the pneumatic control valve.

In a second aspect, there is provided a method for separating liquid from a fluid stream including a mixture of gas and liquid, the method comprising: receiving the fluid stream into a first vessel, the first vessel being in fluid communication with a second vessel via a first valve, where the first valve is initially provided in an open position, and where the second vessel includes a second valve initially provided in a closed position; separating the fluid stream into the gas and the liquid within in the first and second vessels, where the gas passes through an outlet provided to the first vessel whilst the liquid is received by the second vessel; detecting a first predetermined threshold volume using a liquid sensor provided to the second vessel; closing the first valve once the liquid in the second vessel reaches the first predetermined threshold volume; detecting that the first valve has been closed; opening the second valve; discharging the liquid from the second vessel via a liquid outlet in fluid communication with the second valve; detecting a second predetermined threshold volume using the liquid sensor; closing the second valve once the liquid once the liquid in the second vessel reaches the second predetermined threshold volume; detecting that the second valve has been closed; and opening the first valve so that the liquid is again received by the second vessel, wherein the first and second valves are pneumatically operated and the pneumatic operation of the first and second valves allow only one of the first and second valves to be open.

BRIEF DESCRIPTION OF FIGURES

Example embodiments are apparent from the following description, which is given by way of example only, of at least one non-limiting embodiment, described in connection with the accompanying figures.

DETAILED DESCRIPTION

Figure 1:
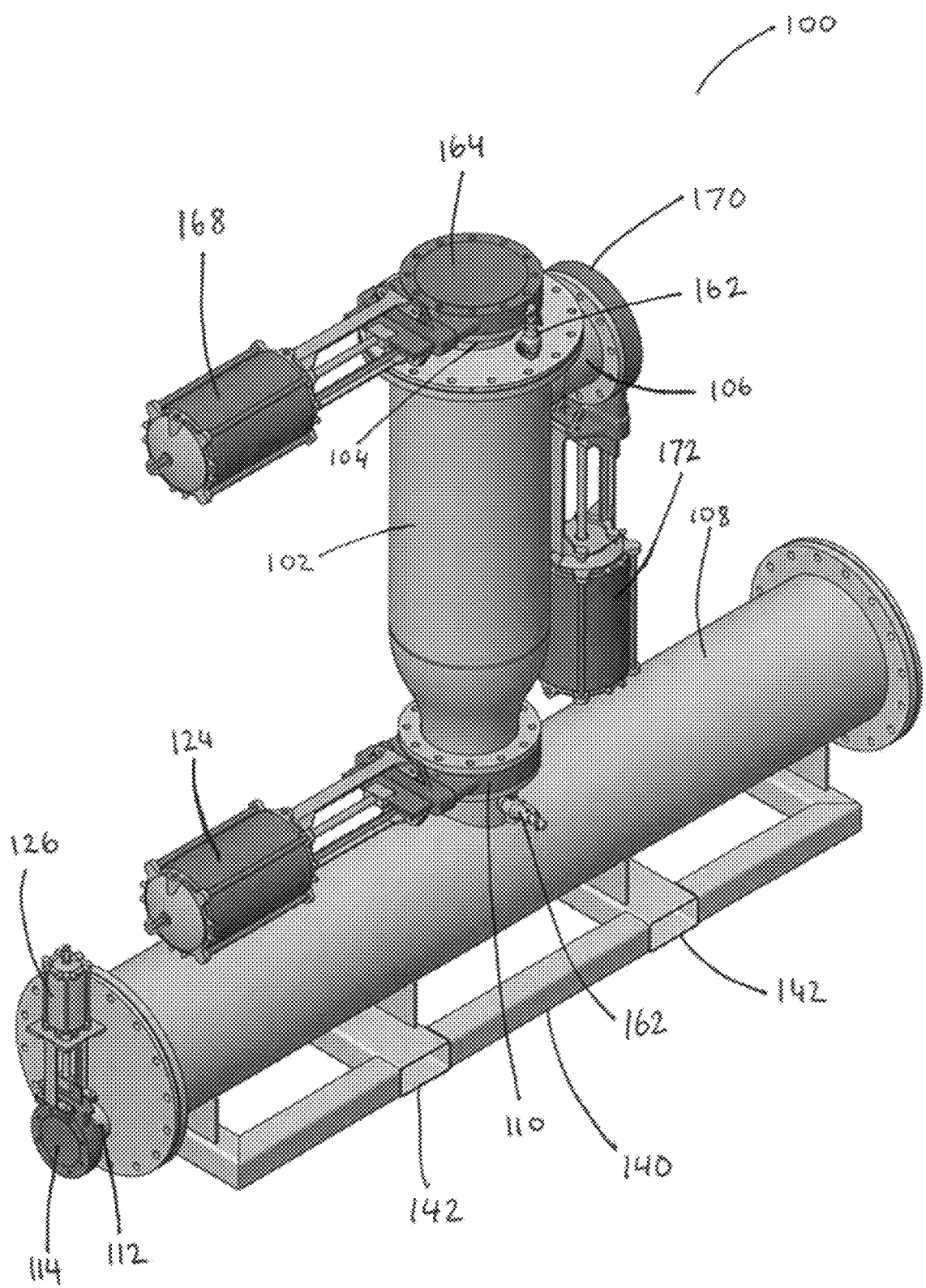
FIG. 1 illustrates a perspective view of an embodiment of the present invention.
Figure 2:
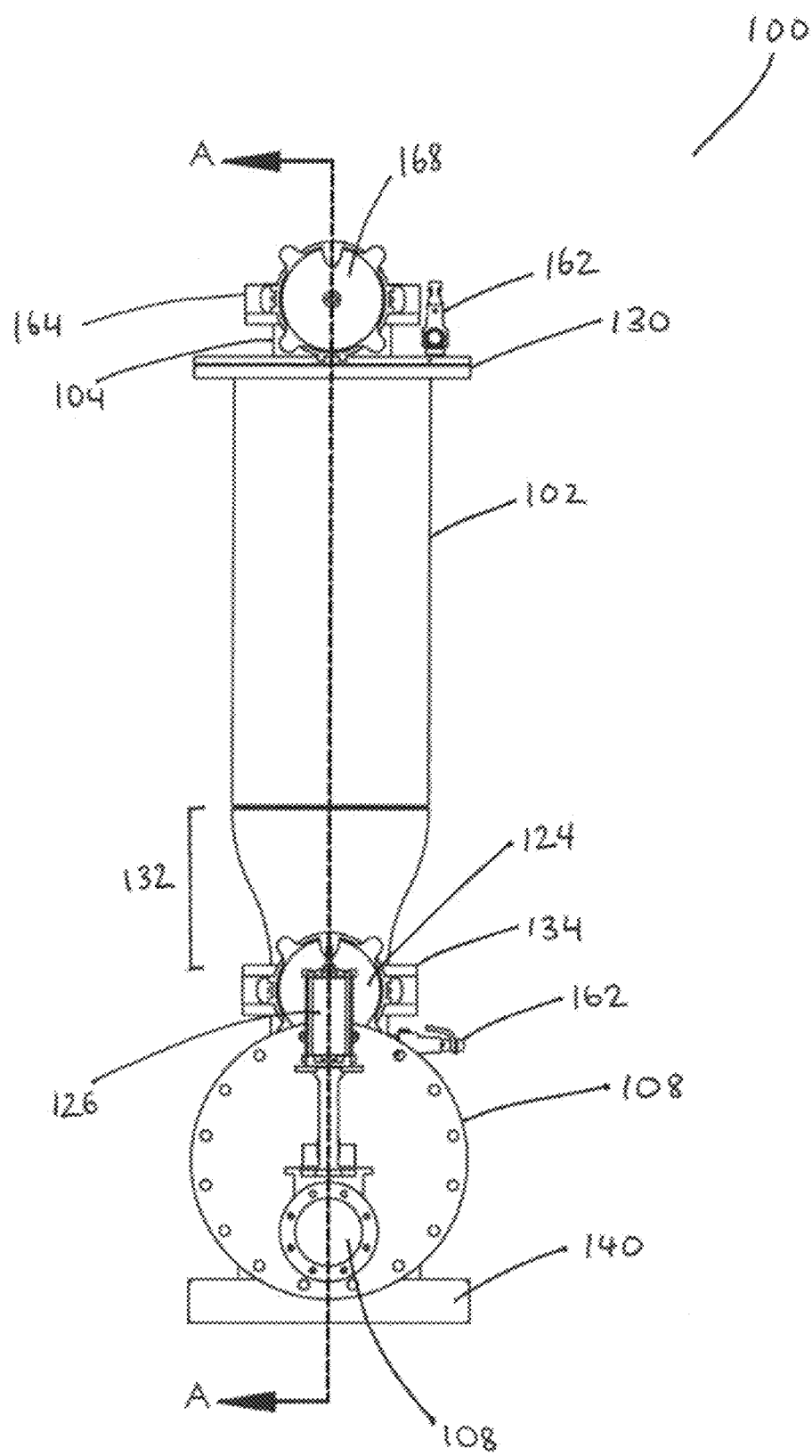
FIG. 2 illustrates a front view of an embodiment of the present invention.
Figure 3:
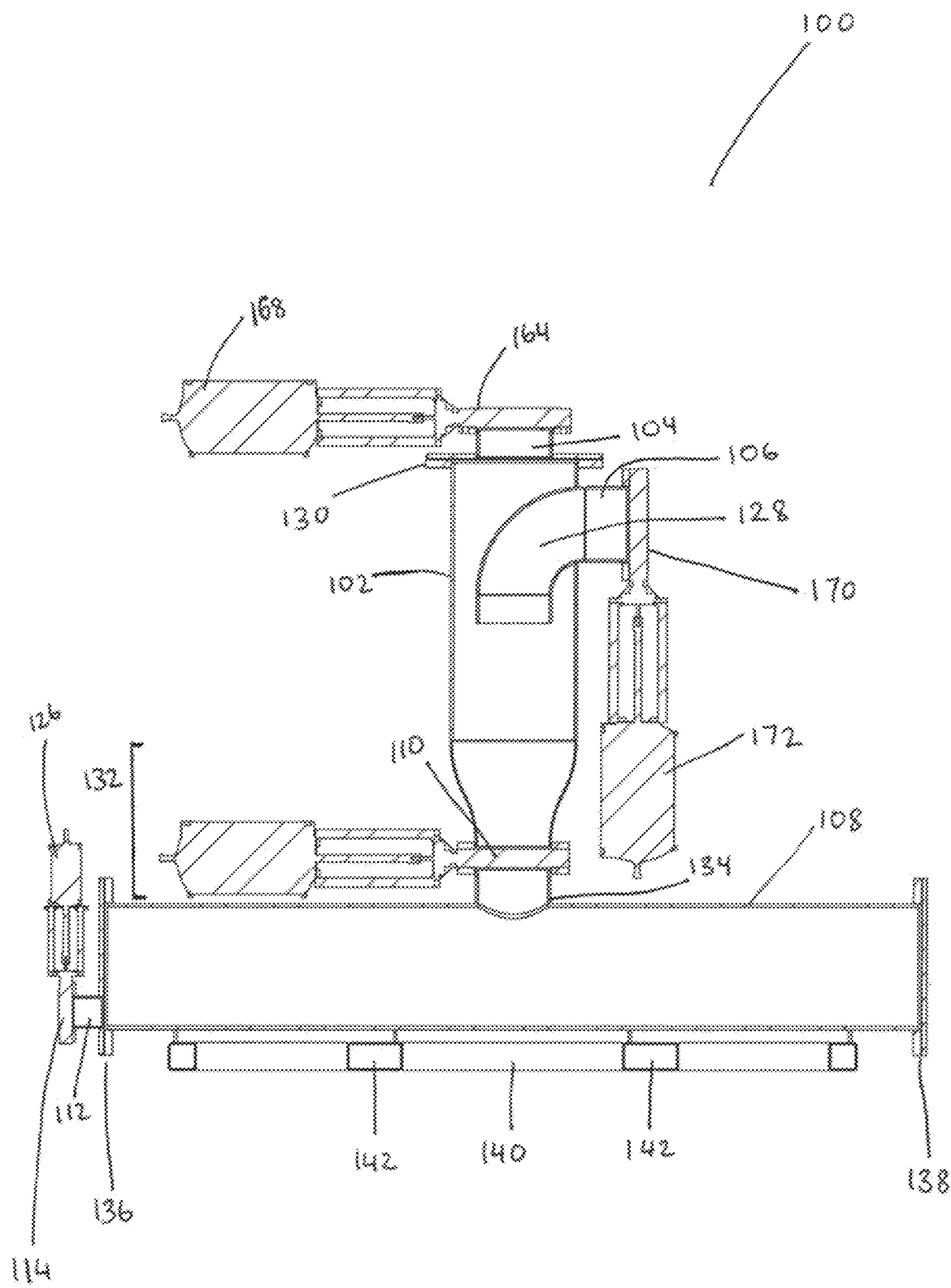
FIG. 3 illustrates a side section view of an embodiment of the present invention through section A-A.
Figure 4:
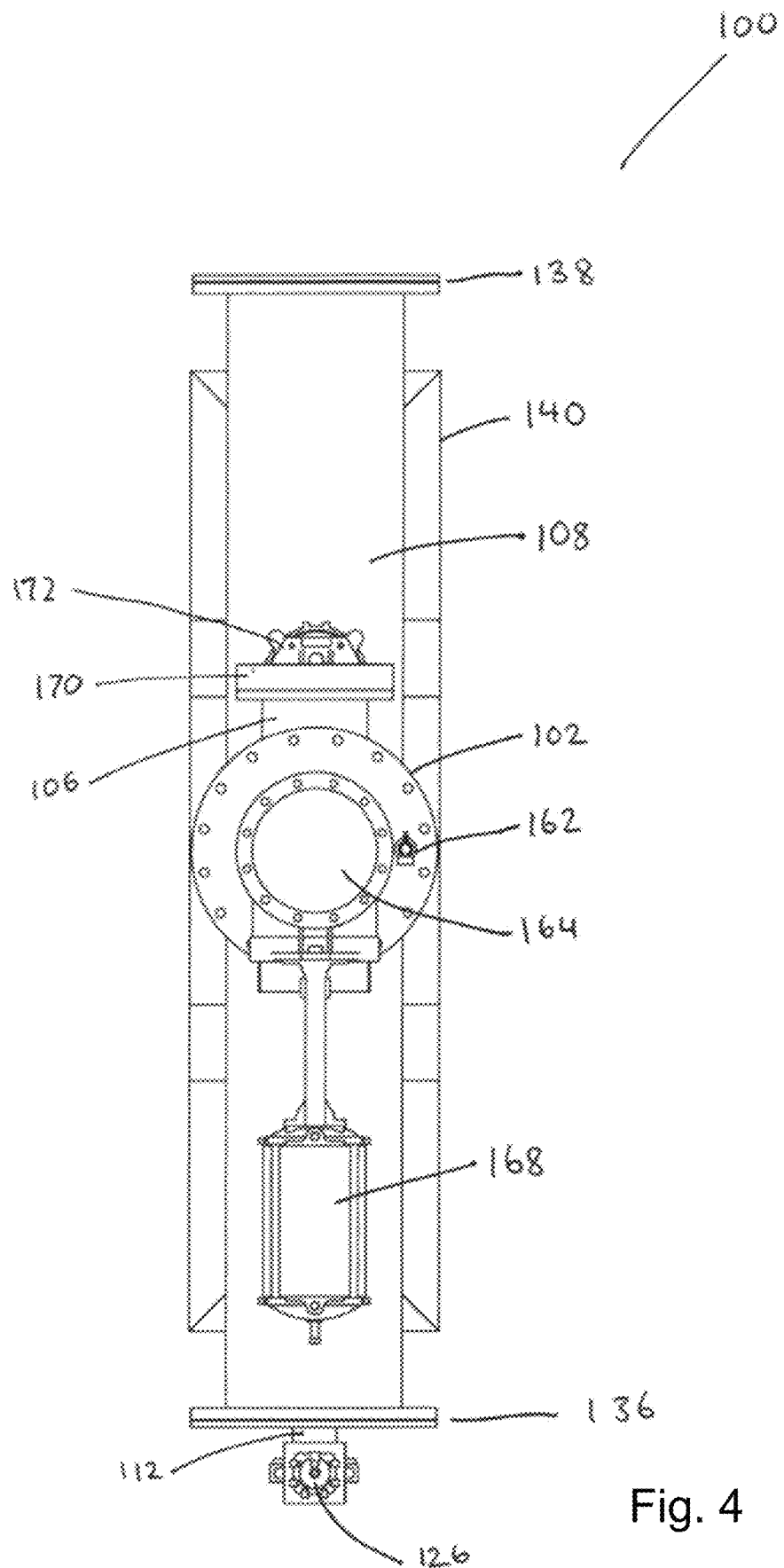
FIG. 4 illustrates a top view of an embodiment of the present invention.

The following modes, given by way of example only, are described in order to provide a more precise understanding of one or more embodiments. In the figures, like reference numerals are used to identify like parts throughout the figures.

Further, the below embodiments are described in relation to use in an underground coalmine. However, as would be understood by the skilled addressee, the use of the invention in a coalmine is merely provided to demonstrate the workings of the invention, and as such, the application of the embodiments described and defined herein is not limited to such use. For example, the embodiments provided may find application in a variety of processes, such as but not limited to oil refineries, natural-gas processing plants, petrochemical and chemical plants, refrigeration systems, air conditioning systems, compressor systems, gas pipelines and the like.

Referring generally to FIGS. 1 to 5, an embodiment of a separator suitable for separating a liquid from a fluid stream is provided, where the fluid stream includes a mixture of gas and liquid. The separator may comprise a first vessel 102 including an outlet 104, the outlet in fluid communication with a source of pressure. For example, the source of pressure may be negative pressure (suction) or the source of pressure may be positive pressure from the pressurised seam in an underground coal mine. The separator further includes an inlet 106 for receiving the fluid stream. The first vessel 102 may be arranged in fluid communication with a second vessel 108 via a first valve 110.

The fluid stream is directed into the inlet 106 from a supply of a fluid stream requiring separation. The fluid stream may be pumped into the inlet 106 or may be under pressure of another form, such as being pressurised from the natural coal seam pressure. The fluid stream may include a mixture of gas and liquid. Further, the liquid in the fluid stream may also include particulates. For example, the liquid may include a slurry of a liquid suspending a mixture of particulates that may include coal, rock, dirt or other particulates. For example, the fluid stream may be collected from a coalface being degassed as part of the mining process. However, a person skilled in the art would understand that this is merely an example to demonstrate the workings of the invention and is understood to be non-limiting. As such, the embodiments described and defined herein find many possible applications for separating a fluid stream including a gas and a liquid.

The second vessel 108 may also be arranged in fluid communication with a liquid outlet 112 via a second valve 114, wherein the first vessel 102 is arranged to enable drainage of the liquid into the second vessel 108. For example, the first vessel 102 may be located above the second vessel 108, or the first vessel 102 may be located adjacent to the second vessel 108 with a connection between them enabling drainage of the liquid into the second vessel 108. Such examples are described in further detail later in the specification.

The valves of the separator are arranged to be moved between open and closed positions, these positions defining different states of the separator 100. A first state is provided where the first valve 110 is arranged to be open when the second valve 114 is closed. A second state is provided where the second valve 114 is arranged to be open when the first valve 110 is closed. That is, the opening and closing of the first valve 110 and second valve 114 is a sequential operation. Use of a sequential operation is to minimise the risk that any gas will escape from the first or second vessel through the liquid outlet 112 once the second valve 114 is opened.

In an embodiment, the second vessel 108 includes a switch 116 that is connected to and operated by a liquid sensor. The liquid sensor is arranged to detect an upper threshold of liquid and a lower threshold of liquid in the second vessel 108. In other words, the liquid sensor is used to trigger between the first and second states of the separator 100. As such, the liquid sensor is arranged to close the first valve 110 upon detection of the upper threshold of liquid, and the liquid sensor is arranged to close the second valve 114 upon detection of the lower threshold of liquid. In an example, the liquid sensor may include a float sensor 118, where the float sensor may be arranged to locate within the second vessel 108 and the float sensor 118 operates the switch 116.

The separator 100 further includes a first valve sensor provided to the first valve 110. The first valve sensor is arranged to determine the state of the first valve 110. That is, whether the first valve 110 is open or shut. The first valve sensor may include a roller leaver valve, magnetic position switch, pneumatic read switch or other similar types of sensors that are capable of detecting when the first valve 110 is completely closed. For example, the first valve sensor may be located within the first pneumatic cylinder 124.

The separator 100 further includes a second valve sensor that is arranged to determine the state of the second valve 114, where the second valve sensor provides status information for the second valve 114. That is, whether the second valve 114 is open or shut. The second valve sensor may include a roller leaver valve, magnetic position switch, pneumatic read switch or other similar types of sensors that are capable of detecting when the second valve 114 is completely closed. For example, the second valve sensor may be located within the second pneumatic cylinder 126.

The operation of the liquid sensor, the first valve sensor and the second valve sensor all work together to ensure safe operation of the separator 100. That is, the liquid sensor is arranged to detect an upper threshold of liquid, which triggers the closing of the first valve 110. The first valve sensor detects when the first valve 110 is fully closed, and in doing so, triggers the opening of the second valve 114 to drain the fluid from the second vessel 108. In other words, the separator 100 is arranged such that the second valve 114 is only opened once the first valve 110 has been closed, so that the two valves are never open at the same time. This arrangement ensures that no gas escapes into the surrounding area through the second valve 114 via the second vessel 108 when the separator is in the first state.

Moreover, the liquid sensor is arranged to detect a lower threshold of liquid, which triggers the closing of the second valve 114. The second valve sensor detects when the second valve 114 is fully closed, and in doing so, triggers the opening of the first valve 110 to once again allow fluid to drain from the first vessel 102 into the second vessel 108. In other words, the separator 100 is arranged such that the first valve 110 is only reopened once the second valve 114 has been closed, so that the two valves are never open at the same time. This arrangement ensures that no gas escapes into the surrounding area through the second valve 114 via the second vessel 108 when the separator is in the second state.

One example of the upper threshold is provided where the liquid in the second vessel 108 fills approximately 70% of the total volume of the second vessel 108. Similarly, the lower threshold may be set where the liquid in the second vessel 108 fills approximately 30% of the total volume of the second vessel 108. As would be appreciated by the skilled addressee, the liquid sensor may be arranged to detect a variety of different upper and lower thresholds as desired for use.

In another example, the upper threshold may be set as where the liquid in the second vessel 108 fills approximately 95% of the total volume of the second vessel 108. Similarly, the lower threshold may be set where the liquid in the second vessel 108 fills approximately 5% of the total volume of the second vessel 108. As a further example, the upper threshold may be within the range of 85 to 100% of the total volume of the second vessel 108 and the lower threshold may be in the range of 0 to 15% of the total volume of the second vessel 108. Such thresholds may be used where a lower flow rate of the mixture of liquid and gas is provided.

In an embodiment, the float sensor 118 may be provided to the second vessel 108 at or proximate to the liquid outlet 112 so that the lower threshold is arranged to just above the top of the liquid outlet 112. Such an arrangement prevents any gas that may have been captured within the second vessel 108 from escaping via the liquid outlet 112 during the second state.

The upper threshold of liquid and the lower threshold of liquid are terms to designate predetermined limits of volume contained in the second vessel 108. The upper and lower thresholds of liquid may vary depending on the rate of flow of the mixture of liquid and gas entering the first vessel 102. For example, a relatively higher lower threshold may be provided to ensure a faster drain cycle to prevent liquid building up in the first vessel 102 during drainage of the second vessel 108.

In an embodiment, the switch 116 controls a pneumatic control valve 120, referred hereafter as the "control valve". The control valve 120 may be arranged to be in connection with an air compressor 122 providing pneumatic pressure to the control valve 120. The control valve 120 may be a 5/2 way pneumatic valve, having one inlet port, two outlet ports and two exhaust ports, or a similar valve. Further, the control valve may include a spring return. For example, the control valve 120 may be 5/2 way single air pilot spring return valve.

The control valve 120 is arranged in pneumatic connection with a first pneumatic cylinder 124 arranged to articulate the first valve 110 using the pneumatic pressure provided by the compressor 122. Further, the control valve 120 is also arranged in pneumatic connection with a second pneumatic cylinder 126 arranged to articulate the second valve 114. The first pneumatic cylinder 124 and the second pneumatic cylinder 126 are described in further detail later in the specification.

An embodiment is provided wherein the first vessel 102 includes at least one nozzle 128, the at least one nozzle 128 being arranged to receive the fluid stream from the inlet 106. The at least one nozzle 128 is also arranged to direct the fluid stream into the first vessel 102.

The at least one nozzle 128 may be arranged to direct a flow of the fluid stream towards the first valve 110. As such, the size and shape of the at least one nozzle 128 may vary depending on the features of the fluid stream and the relative size, shape and arrangement of the first vessel 102 and the second vessel 108. Such an arrangement aims to improve the efficacy of the separation of the fluid stream into gas and liquid.

For example, the at least one nozzle 128 may direct the liquid into the separator in such a way to enable the liquid to flow through the first valve 110 into the second vessel 108, whilst the gas passes up through the outlet 104. For example, the movement of the gas through the outlet 104 may occur without additional force, or may be aided by the pressure of the fluid stream entering the inlet 106 and/or by the provision of a suction pressure being provided to the outlet 104.

In an embodiment, the relative arrangement of the first vessel 102 relative to the second vessel 108 may also aid in the separation of the liquid from the gas in the first vessel 102. In one example, the first vessel 102 may be arranged above the second vessel 108. That is, the first vessel is directly connected to the top of the second vessel 108, via the first valve 110.

Alternatively, the first vessel 102 may be arranged adjacent to the second vessel 108, where a length of connection, such as tubing, hosing or piping may be arranged to connect the first vessel 102 and the second vessel 108. Such an arrangement may include a first end the piping been connected to the bottom of the first vessel 102 and a second end of the piping being connected to the top of the second vessel. In both such arrangements, the pressure caused by gravity affecting the mass of the liquid in the first vessel 102 enables the liquid to flow through the first valve 110 to be retained by the second vessel 108.

In an embodiment, the at least one nozzle 128 may be arranged such that the flow of the fluid stream entering the at least one nozzle 128 is in a direction that is perpendicular to a direction of the flow of the fluid stream exiting the at least one nozzle 128. In other words and in reference to FIG. 3, the at least one nozzle 128 may include a curved section of piping that receives the flow of the fluid stream along a substantially horizontal direction and output the flow of the fluid stream in a downwards direction towards the first valve 110. That is, the at least one nozzle 128 may include a 90° bend. In an alternate embodiment, the at least one nozzle 128 may include a straight section of horizontal pipe (not shown) that protrudes into the first vessel 102.

As would be understood by the skilled addressee, the at least one nozzle 128 may include other features. For example, the at least one nozzle 128 may include or be supplied from two or more smaller nozzles, where the mixture of liquid and gas come from multiple locations to be separated by the same separator 100. By way of a non-limiting example, the two or more nozzles may each be connected to different parts along a coal seam or multiple connections to an industrial process. Further, the at least one nozzle 128 may also include other features that improve the efficacy in the separation of the fluid stream. For example, the nozzle may include one or more baffles arranged to slow the velocity of the fluid stream entering the first vessel 102 and to provide a larger surface area for the liquid to catch and drain down into the second vessel 108.

The shape, size and relative arrangement of the first vessel 102 and the second vessel 108 may be provided to enable the fluid collected by the first vessel 102 to drain into the second vessel 108. The first vessel 102 and the second vessel 108 may vary and may include a number of features to improve the separation of the fluid stream. In one example, the first vessel 102 and the second vessel 108 may be elongate shaped. Within the specification, the term "elongate" refers to something being longer along one axis relative to another axis. Further, when referring to FIG. 3, an embodiment may be provided where the first vessel 102 may be elongate in a substantially vertical direction and the second vessel 108 may be elongate in a substantially horizontal direction. Alternatively, an embodiment may be provided where the first vessel 102 may be elongate in a substantially vertical direction and the second vessel 108 may be elongate in a substantially vertical direction, or the first vessel 102 may be elongate in a substantially horizontal direction and the second vessel 108 may be elongate in a substantially horizontal direction. As such, the person skilled in the art would understand that the form, size and shape of the first vessel and second vessel may vary so long as the first vessel 102 is arranged to drain into the second vessel 108.

In an embodiment, the first vessel 102 may be cylindrically shaped at a first end 130 and may include a tapered shaped portion 132 at a second end 134. Further, the second vessel 108 may be cylindrically shaped at both a first end 136 and a second end 138. The tapered shaped portion 132 at the second end 134 of the first vessel 102 may be arranged to connect to the second vessel 108 at a location along the length of the second vessel 108 between the first end 136 and the second end 138. The first valve 110 may be arranged to locate at the second end 134 of the first vessel 102. The location of the first valve 110 enables for the first vessel 102 to be isolated from the second vessel 108.

Moreover, the vessels may include features to improve the efficacy in the separation of the fluid stream. For example, the first vessel 102 may include baffles provided to the interior walls, where the one or more baffles are arranged to slow the velocity of the fluid stream in the first vessel 102 and to provide a larger surface area for the liquid to catch and drain down into the second vessel 108.

In an embodiment, the second valve 114 is arranged to locate at either the first end 136 or the second end 138 of the second vessel 108. The second valve 114 is arranged to drain the liquid collected in the second vessel 108. The first valve 110 and the second valve 114 are described in further detail below.

In an embodiment, the second vessel 108 may include a base frame 140. The base frame 140 may include an arrangement of intersecting struts that form a frame on which the base of the second vessel 108 rests. The base frame 140 is arranged such that the second vessel 108 is able to be arranged level on a flat surface. For example, where the liquid sensor is a float sensor 118, the second vessel 108 needs to be flat so that the float sensor is able to correctly determine the upper threshold volume and the lower threshold volume.

In an embodiment, the base frame 140 may further include two or more engagement portions. The two or more engagement portions may be arranged to allow for engagement with machinery capable of moving the separator 100. For example, the two or more engagement portions may include hollow struts 142 that are arranged to receive the twin forks of a forklift. Alternatively, the two or more engagement portions may include an arrangement of clasps provided to the base frame 140, where the clasps, may be connected to chains and a lifting mechanism to enable the separator 100 to be moved and positioned appropriately.

As would be understood by the person skilled in the art, various types of pneumatically operated valves may be capable of carrying out the workings of the invention and are thus considered to fall within the scope of the invention as described and defined in the claims. For example, such valves may include knifegate valves, gate valves, butterfly valves or ball valves, or other known types of valves.

In an embodiment, the same valve type may be used for all valves included in the separator 100. For example, the first valve 110 and the second valve 114 may be a pneumatically operated knifegate valves. Alternatively, different combinations of valves may be used at different parts of the separator 100. For example, where the first valve 110 may be a pneumatically operated butterfly valve and the second valve 114 may be pneumatically operated knifegate valve.

In an embodiment, the liquid in the fluid stream has a high viscosity and/or includes particulates. For example, the liquid may include a slurry of a liquid suspending a mixture of particulates that may include coal, rock, dirt or other particulates. A knifegate may be advantageous in such cases as the knifegate valve is arranged to cut through any build-up of solid material around the valve, hence reducing the risk that the valve may become stuck open. Alternatively, in cases where the liquid has a low viscosity or is located in a position where any build-up of solid material around the valve is unlikely, a butterfly valve may alternatively be used.

Figure 5:
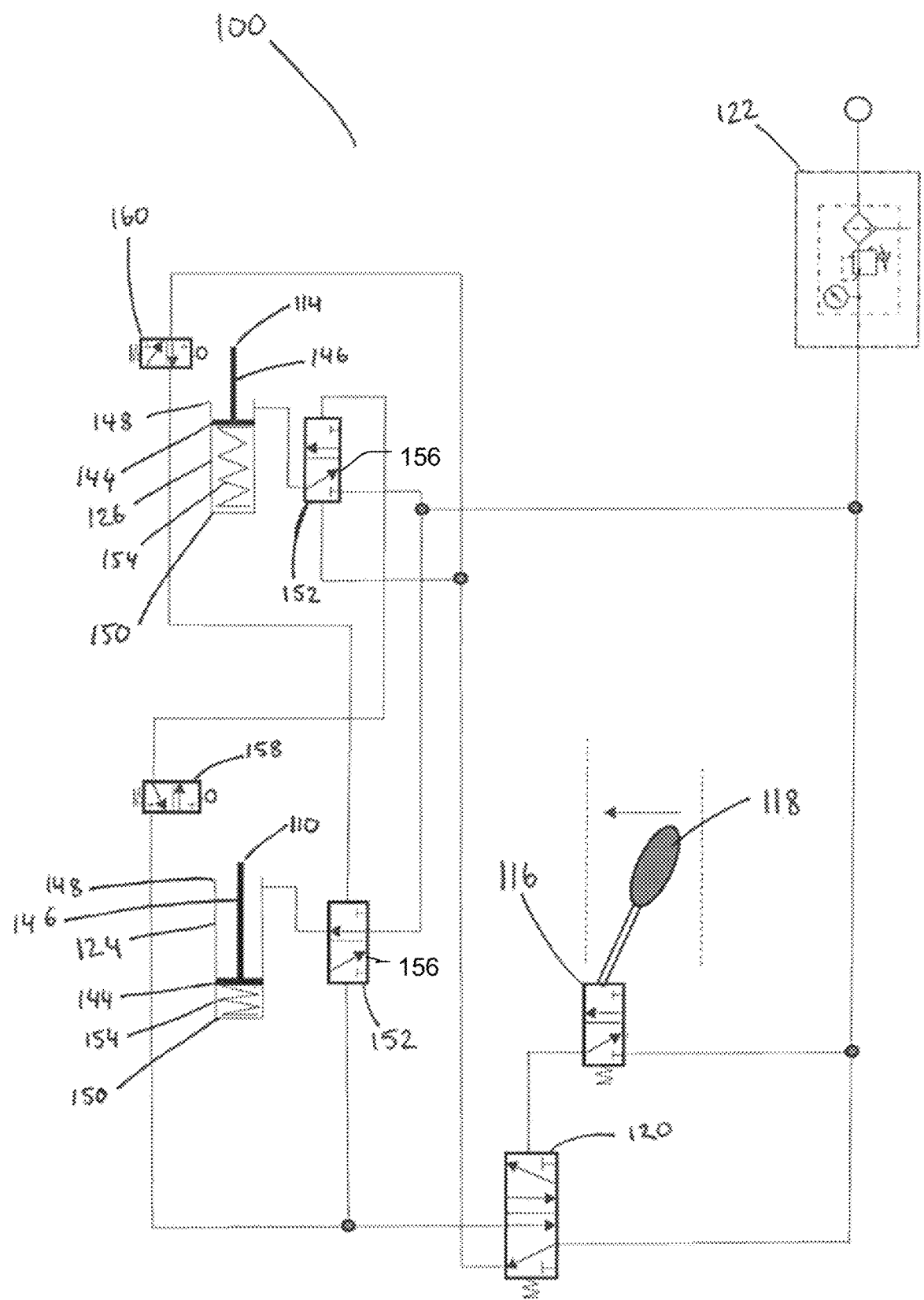
FIG. 5 illustrates a pneumatic flow diagram of an embodiment of the present invention in a first state.
Figure 6:
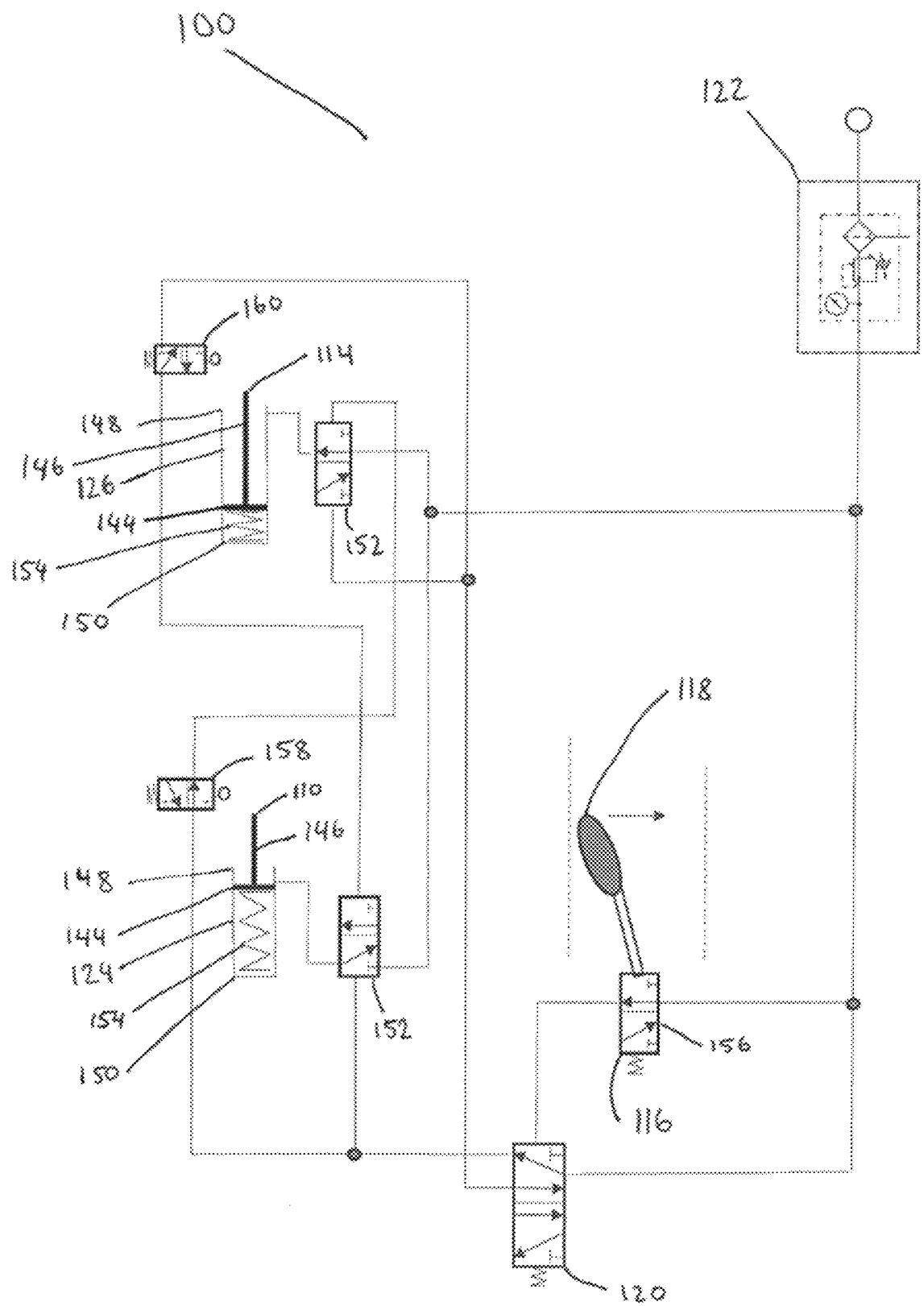
FIG. 6 illustrates a pneumatic flow diagram of an embodiment of the present invention in a second state.
Figure 7:
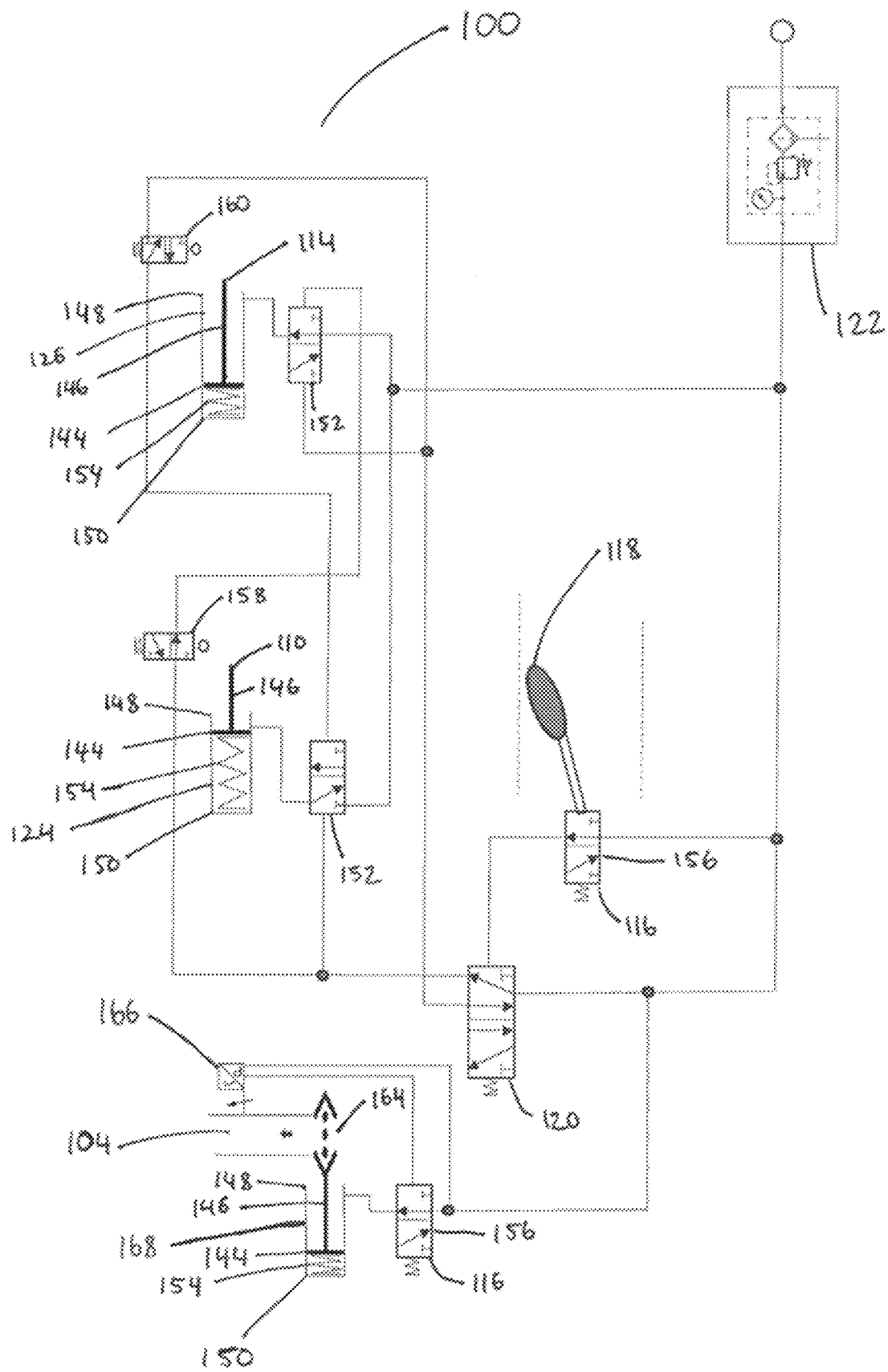
FIG. 7 illustrates a pneumatic flow diagram of an alternate embodiment of the present invention.
Figure 8:
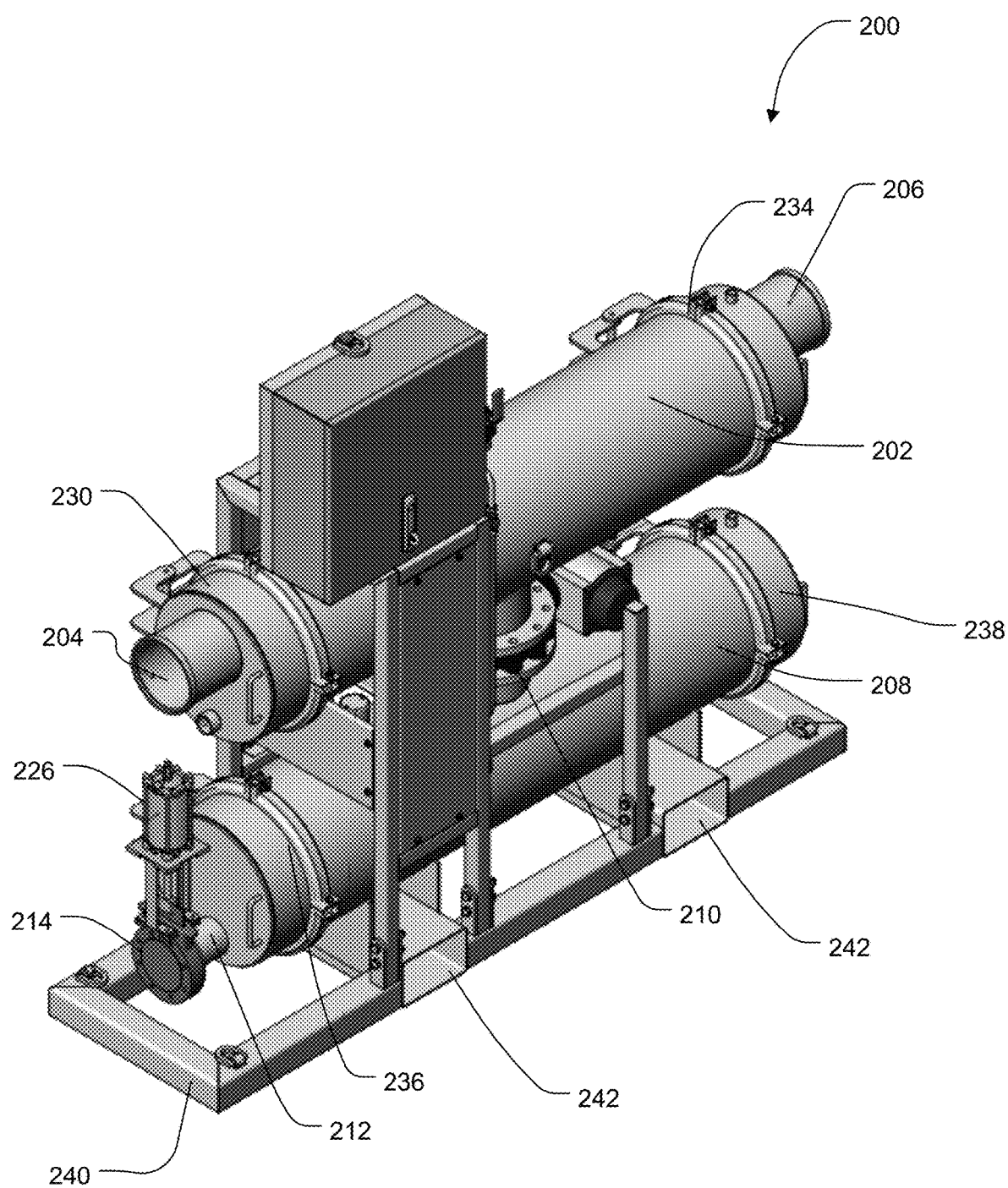
FIG. 8 illustrates a perspective view of a separator according to an embodiment of the present invention.
Figure 9:
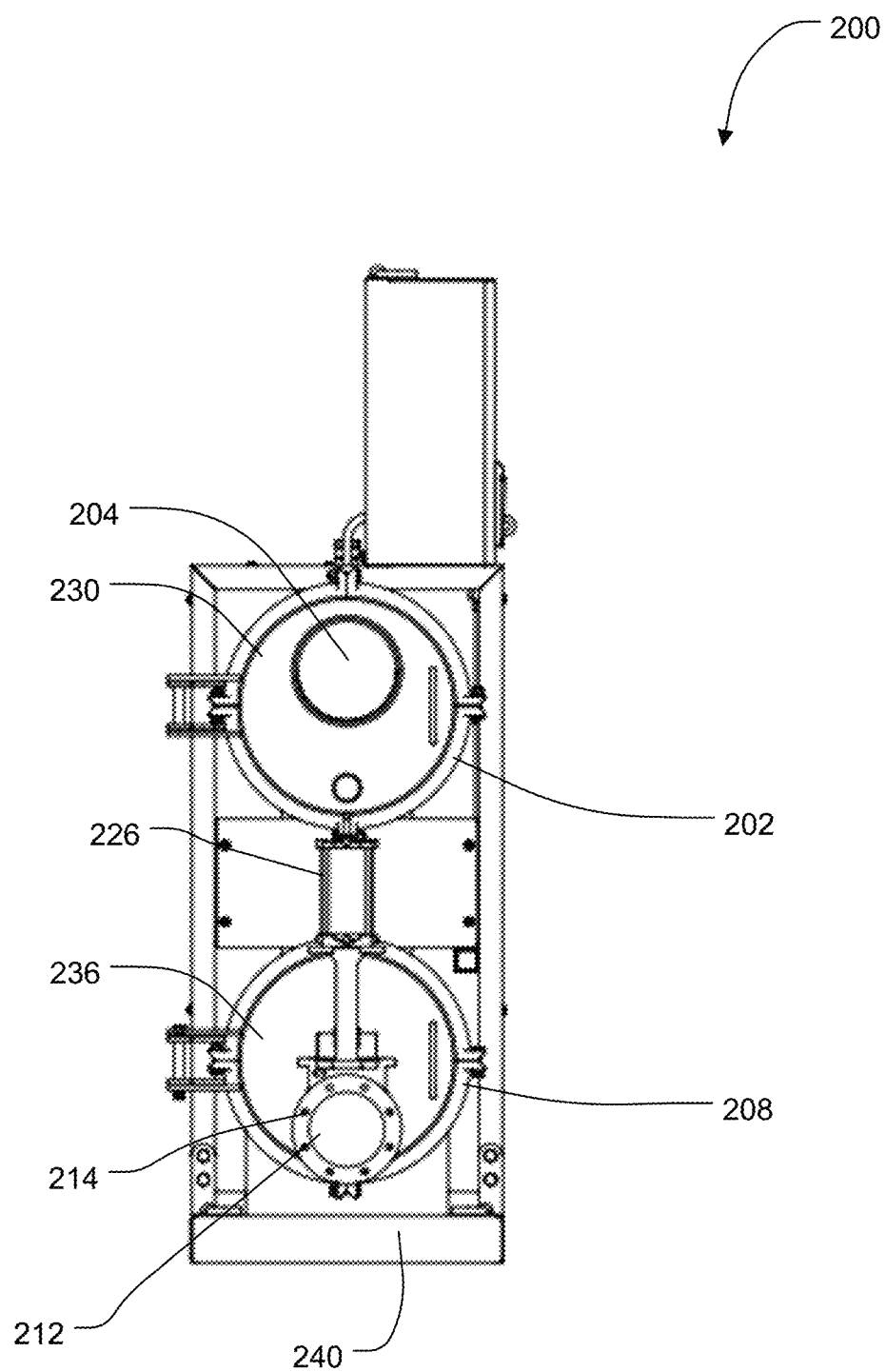
FIG. 9 illustrates a front view of the separator of FIG. 8.
Figure 10:
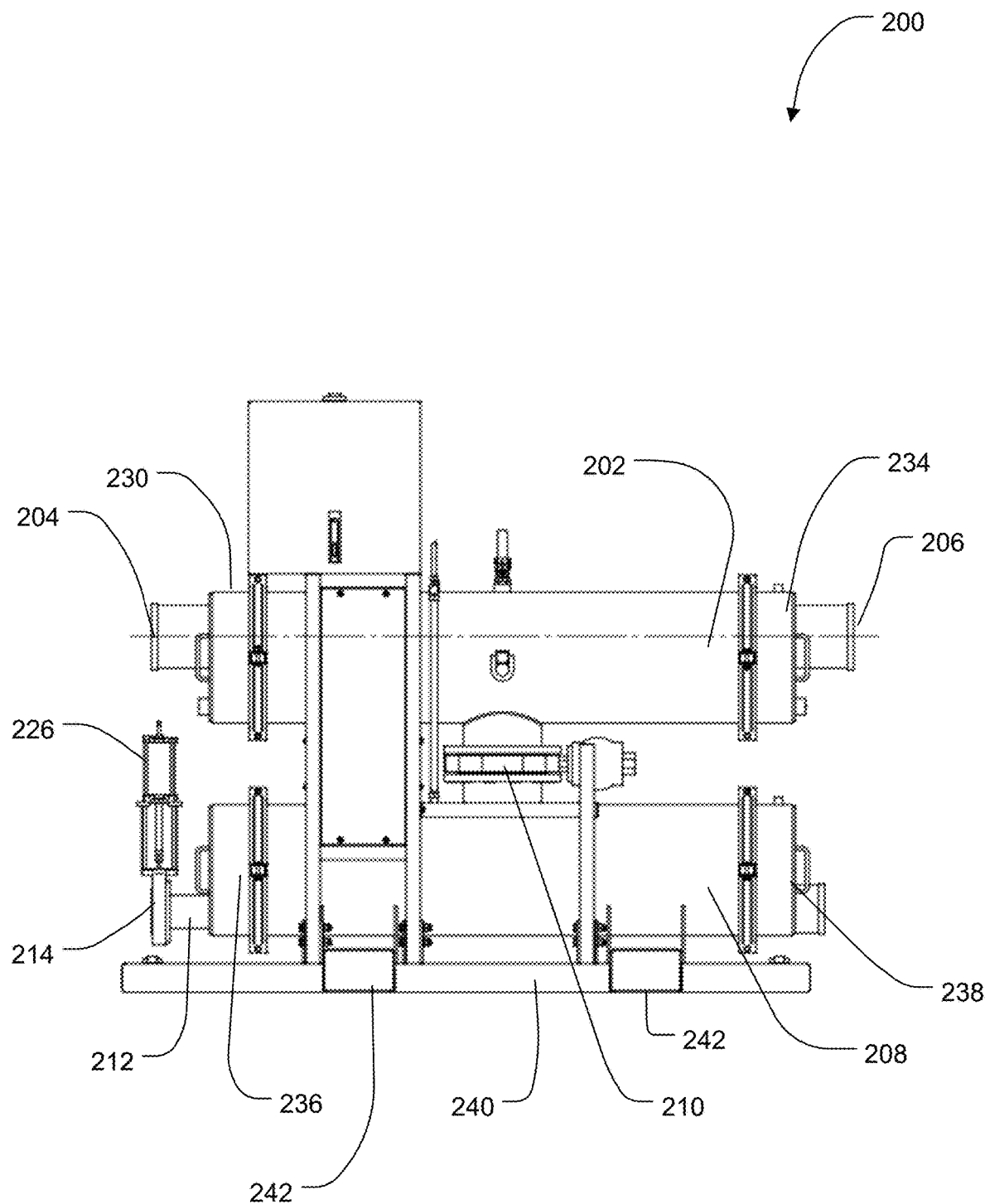
FIG. 10 illustrates a side view of the separator of FIG. 8.
Figure 11:
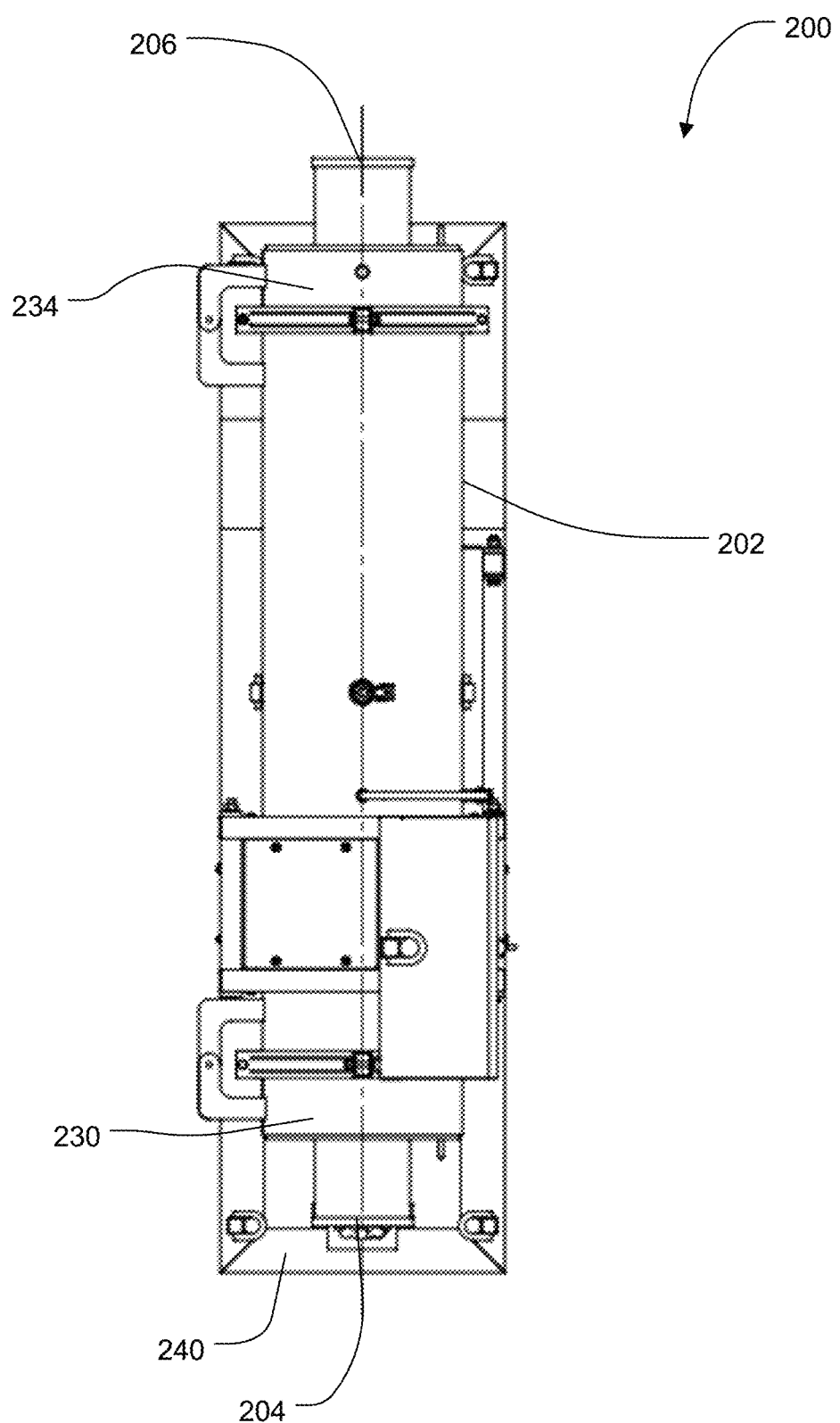
FIG. 11 illustrates a top view of the separator of FIG. 8.

Referring to FIGS. 5 to 7, the first and second valves, and the third and fourth valves that are described in more detail later in the specification, each include a pneumatic cylinder to articulate the valve between an open position, a closed position, and possibly a throttled position. Each of the pneumatic cylinders 124 and 126 may be double acting and include a moveable piston housed within the cylinder, where the piston comprises a disk 144 in connection with a rod 146 so that movement of the piston articulates the valve. Each of the pneumatic cylinders 124 and 126 may further include a piston valve 152 that is arranged to control the flow of pneumatic pressure entering and exiting the pneumatic cylinder at either side of the disk 144. Alternatively, each of the pneumatic cylinders provided to the valves may be a single acting cylinder with a pneumatic port provided to open the valve and a spring provided to the cylinder that is arranged to close the valve.

The pneumatic pressure moves the piston between a fully extended position and a fully retracted position. In the fully extended position, the disk 144 is moved to be adjacent to the rod end 148 of the pneumatic cylinder. When the piston is fully extended, the pneumatic cylinder closes the valve. In the fully retracted position, the disk 144 is moved to be adjacent to the cap end 150 of the pneumatic cylinder. When the piston is fully retracted, the pneumatic cylinder opens the valve. The movement of the piston is facilitated by the pneumatic pressure provided to the cylinder by the air compressor 122 and the control valve 120.

Each of the pneumatic cylinders may be arranged to include safety features to close or open the valves in the case where the pneumatic pressure ceases. For example, the first pneumatic cylinder 124 and the second pneumatic cylinder 126 may include a bias mechanism arranged to bias the first valve 110 and the second valve 114 closed in the event of a loss of pneumatic pressure. The bias mechanism may include a spring 154 located between the cap end 150 and the disk 144 of the respective pneumatic cylinders 124 and 126 so that the spring 154 biases the piston to the fully extended position. Thus, if pneumatic pressure ceases, the valves are biased to a closed position.

Referring to FIG. 5, as the piston moves between its fully extended and fully retracted positions, air is expelled from the part of the pneumatic cylinder not receiving the pneumatic pressure. This results in pneumatic pressure needing to be vented from the separator 100, which may be vented by vents 156.

In an embodiment, the separator 100 may further include additional valves that aid in controlling the direction of pneumatic pressure in the separator 100. That is, when the control valve 120 switches between states, the direction of pneumatic pressure supplied to the pneumatic cylinders changes. The additional valves may be provided at various locations, such as but not limited to positions 158 and 160.

Further, the separator 100 may further include pressure relief valves 162. The pressure relief valves 162 may be located at a variety of different locations. However, for the purpose of demonstrating the workings of the invention, the pressure relief valves 162 are provided to the first vessel 102 proximate to the first end 130 and provided to the second vessel 108 proximate to the first valve 110. The pressure relief valves 162 are provided to provide a relief outlet should the pressure in either of the vessels exceed a predetermined limit.

Referring to FIGS. 1 to 4 and 7, there is provided an embodiment where, the separator 100 may further include a third valve 164. The third valve 164 may be provided at a variety of locations on the first vessel 102. For example, the third valve 164 may be provided to the inlet 106 of the first vessel 102 or be provided proximate to the first valve 110 where the liquid exits the first vessel 102. For example, where the third valve 164 is arranged to locate at the first end 130 of the first vessel 102.

The first vessel 102 may include a pressure sensor 166, where the pressure sensor 166 may be arranged in connection with a third pneumatic cylinder 168 and piston valve 152. The third pneumatic cylinder 168 and piston valve 152 may be arranged to articulate the third valve 164, such that upon the pressure sensor 166 detecting an operating pressure, the third pneumatic cylinder 168 closes the third valve 164. Furthermore, third valve 164 may also include a bias mechanism to bias the third valve 164 closed in the event of a loss of pneumatic pressure as described above in relation to the first valve 110 and the second valve 114. That is, the bias mechanism may include a spring 154 located between the cap end 150 and the disk 144 of the third pneumatic cylinder 168 so that the spring 154 biases the piston to the fully extended position. Thus, if pneumatic pressure ceases, the third valve 164 is biased to a closed position. However, it would be understood by the skilled person that the operation of the third valve 164 is independent from the other valves.

For example, the pressure sensor 166 in one location may be arranged to detect a negative pressure or "suction" threshold, such as a negative pressure supplied to the outlet 104 to aid in gas extraction from the separator 100. Alternatively, the pressure sensor 166, when located in another location, may be arranged to detect a positive pressure threshold, such as pressure supplied by a high-pressure coal seam that pushes the fluid stream into the separator 100, where such pressure may overcome any suction supplied to the outlet. As would be within the purview of the skilled addressee, the pressure sensor may be arranged to detect a vast range of operating pressures at a variety of different positions. For example, where the third valve 164 is provided to the outlet 104, the pressure sensor 166 is provided to maintain the third valve 164 in an open position, until such time that the negative pressure at the outlet is detected beneath the negative pressure threshold, at which point, the third valve 164 is closed. This arrangement may still enable the separator 100 to separate and drain the liquid.

Furthermore, the pressure sensor 166 may be arranged to continuously detect the relevant operating pressure. As such, the pressure sensor 116 may be provided in connection with a pressure switch (not shown), which enables the pressure sensor 166 to open or close the third valve 164 depending on the operating pressure detected. For example, where the pressure sensor 166 detects a pressure at the outlet 104 that is outside a desired operating pressure range, the third valve 164 is closed. Once the pressure sensor 166 again detects the pressure being within the desired operating pressure range at the outlet 104, the third valve 164 is re-opened.

In another embodiment, the separator 100 may further include a fourth valve 170 arranged to locate between the at least one nozzle 128 and the inlet 106. The fourth valve 170 may be arranged to close off the flow of the mixture of liquid and air into the inlet 106. For example, the fourth valve 170 may be used to isolate the separator 100 from the rest of the system.

In an embodiment, the fourth valve 170 may be a manually operated valve, which may be opened or closed by the articulation of a handle or wheel (not shown) that is under the control of a user. Alternatively, the fourth valve 170 may be pneumatically operated by a fourth pneumatic cylinder 172 and piston valve (not shown) in a similar manner to the first 110, second 114 or third 162 valves as described above. Furthermore, fourth valve 170 may also include a bias mechanism to bias the fourth valve 170 closed in the event of a loss of pneumatic pressure as described above in relation to the first valve 110, the second valve 114 and the third valve 170 above. That is, the bias mechanism may include a spring 154 located between the cap end 150 and the disk 144 of the fourth pneumatic cylinder 172 so that the spring 154 biases the piston to the fully extended position. Thus, if pneumatic pressure ceases, the fourth valve 170 is biased to a closed position. However, it would be understood by the skilled person that the operation of the fourth valve 170 is independent from the other valves.

The fourth valve 170 may also be in connection with a further pressure sensor (not shown). The further pressure sensor may be provided in a similar fashion to pressure sensor 166 in connection with the third valve 164. That is, the fourth pneumatic cylinder 172 and piston valve may be arranged to articulate the fourth valve 170, such that upon the further pressure sensor detecting an operating pressure, the fourth pneumatic cylinder 172 closes the fourth valve 170.

For example, the further pressure sensor may be arranged in connection with the fourth valve 170 to detect a positive pressure threshold, such as pressure supplied by a high-pressure coal seam that pushes the fluid stream into the separator 100, where such pressure may overcome any suction supplied to the outlet. By providing a further pressure sensor at or proximate to the fourth valve 170, it enables isolation of the separator 100 from the system.

Furthermore, the further pressure sensor may be arranged to continuously detect the relevant operating pressure. As such, the further pressure sensor may be provided in connection with a further pressure switch (not shown), which enables the further pressure sensor to open or close the fourth valve 170 depending on the operating pressure detected. For example, where the further pressure sensor detects a pressure at the inlet 106 that is outside a desired operating pressure range, the fourth valve 170 is closed. Once the further pressure sensor once again detects the pressure being once again within the desired pressure range, the fourth valve 170 is re-opened.

As mentioned above, the same or different valve type may be used for the valves included in the separator 100. For example, the third valve 164 may be a pneumatically operated knifegate valve or a pneumatically operated butterfly valve. In a further example, the fourth valve 170 may also be a pneumatically operated knifegate valve, ball valve or a pneumatically operated butterfly valve.

Referring to FIG. 5, the separator 100 may be initially set in the first state with the first valve 110 in an open position and the second valve 114 in a closed position. In the first state, the fluid stream flows through the inlet 106 and into the first vessel 102. As this process occurs, the liquid and gas separate where, the liquid guided by gravity flows down through the first vessel 102 and collects in the second vessel 108. Meanwhile, the gas guided by a negative air pressure from the outlet 104 being in fluid communication with a source of negative air pressure.

In an embodiment, upon detection of the upper threshold volume, the control valve 120 controls the pneumatic pressure in a first direction to articulate the first valve 110 to a closed position. That is, the first state is provided where the first vessel 102 and the second vessel 108 are in fluid communication with one another.

As the fluid stream is received by the first vessel 102, the liquid and gas separate and the second vessel 108 fills with liquid until the float sensor 118 detects the upper threshold volume. Upon detection of the upper threshold volume, the float sensor 118 switches the switch 116 to change the operation of the control valve 120, which closes the first valve 110. The closing of the first valve 110 triggers a second state. It would be understood that at the upper threshold volume, the liquid in second vessel 108 contains little to no gas, as the liquid in the second vessel 108 displaces any of the gas into the first vessel 102.

Only once the first valve 110 is moved to a fully closed position is the second valve 114 is then moved into an open position by means of the first valve sensor. The closed position of the first valve 110 is detected by the first valve sensor provided to the first valve 110. The first valve sensor is arranged to determine the state of the first valve 110. That is, whether the first valve 110 is open or shut. The first valve sensor may include a roller leaver valve, magnetic position switch, pneumatic read switch or other similar types of sensors that are capable of detecting when the first valve 110 is completely closed.

Referring to FIG. 6, an embodiment is provided, where upon detection of the lower threshold volume, the control valve 120 controls the pneumatic pressure in a second direction to articulate the second valve 114 to a closed position. That is, in the second state, the first vessel 102 is isolated from the second vessel 108 by means of the closed first valve 110. The pneumatic pressure in the first direction of the first state is opposite to the pneumatic pressure in a second direction of the second state.

Only once the second valve 114 has been moved into the closed position is the first valve 110 then moved to the open position. The closed position of the second valve 114 is detected by the second valve sensor that is arranged to determine the state of the second valve 114. That is, whether the second valve 114 is open or shut. The second valve sensor may include a roller leaver valve, magnetic position switch, pneumatic read switch or other similar types of sensors that are capable of detecting when the second valve 114 is completely closed.

As such, in an embodiment, there is provided a method for separating liquid from a fluid stream including a mixture of a gas and liquid, where the method may comprise the following steps.

The first step includes receiving the fluid stream into a first vessel 102, the first vessel 102 being in fluid communication with a second vessel 108 via a first valve 110, where the first valve 110 is initially provided in an open position, and where the second vessel 108 includes a second valve 114 initially provided in a closed position.

Further, the method includes the step of separating the fluid stream into the gas and the liquid within in the first vessel 102 and second vessel 108, where the gas passes through an outlet 104 provided to the first vessel 102 and where the liquid is received by the second vessel 108. In other words, upon the fluid stream flowing into the first vessel 102, the fluid stream separates into a gas and a liquid. The liquid, being affected by gravity, flows into the second vessel 108 and the gas floating or is suctioned up towards the outlet 104. The separated gas is passed through the outlet 104 provided to the first vessel 102. Meanwhile, the second vessel 108 continues to fill with liquid.

The method further includes the step of detecting a first predetermined threshold volume using a liquid sensor provided to the second vessel 108. For example, the threshold volume may be the upper volume threshold detected using the float sensor 118 as described above.

The method further comprises the step of closing the first valve 110 once the liquid in the second vessel 108 reaches the first predetermined threshold volume. A first valve sensor may be used to detect closing of the first valve 110, where only after the first valve 110 has been fully closed, does the first valve sensor enable the second valve 114 to be opened.

The closing of the first valve 110 prevents the separated liquid from entering the second vessel 108. However, as the fluid is building up inside the first vessel 102, the method enables discharging the liquid from the second vessel 108 via a liquid outlet 112 in fluid communication with the second valve 114.

The method then further comprises the step of detecting a second predetermined threshold volume using the liquid sensor. For example, the threshold volume may the lower volume threshold that is detected using the float sensor 118 as described above.

The method further comprises the step of closing the second valve 114 once the liquid in the second vessel 108 reaches the second predetermined threshold volume. A second valve sensor may be used to detect closing of the second valve 114, where only after the second valve 114 has been fully closed, does the first valve sensor enable the first valve 110 to be re-opened. In doing so, separated liquid is again received by the second vessel 108. In other words, the method may begin again.

During operation of the method, the first valve 110 and the second valve 114 may be pneumatically operated and the pneumatic operation of the first valve 110 and second valve 114 allows only one of the first and second valves to be open. In such an arrangement, the first valve 110 and the second valve 114 have an interlocking operation where one valve must be closed before the other valve may open.

Figure 12A:
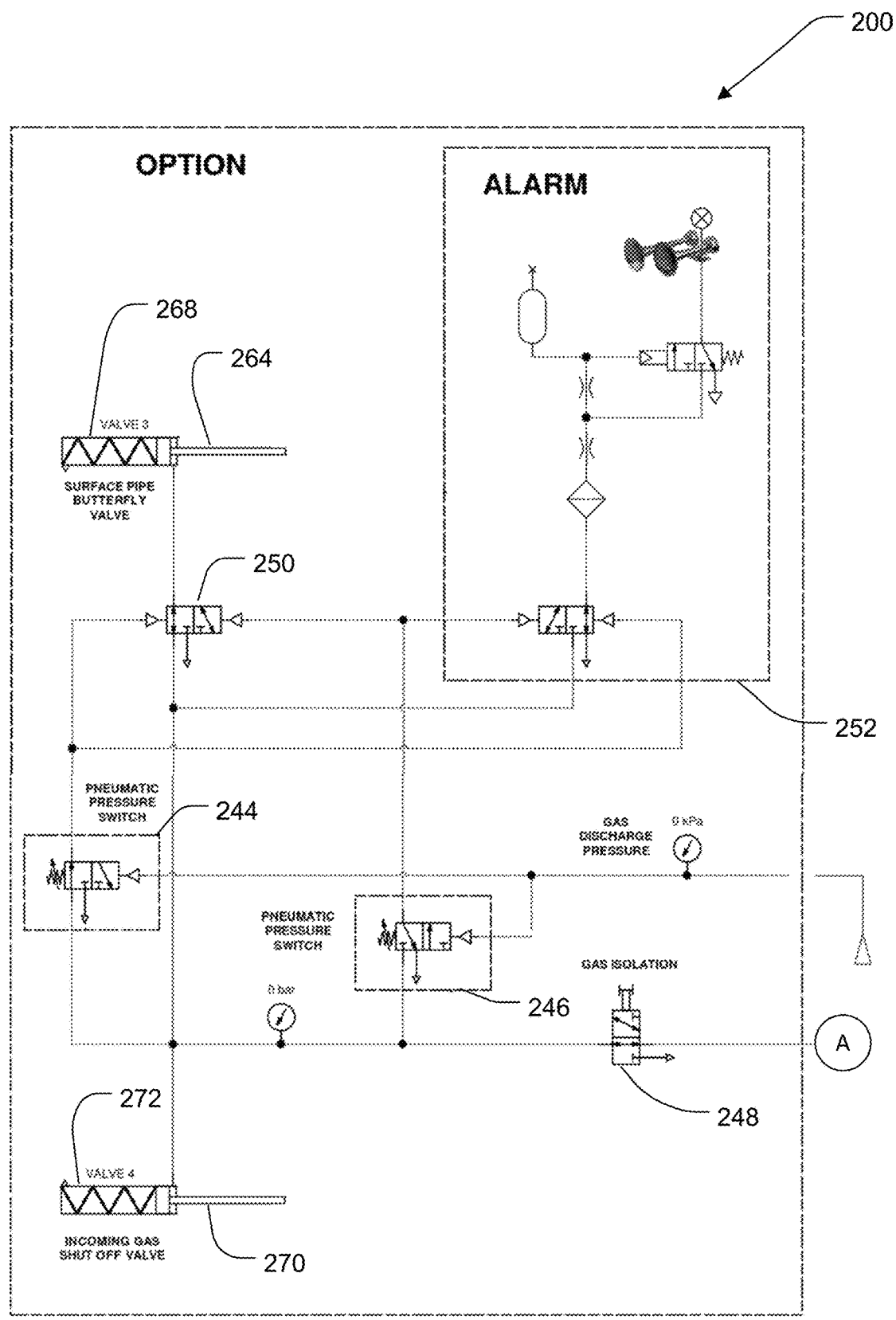
FIGS. 12A, 12B and 12C illustrate a pneumatic flow diagram for the separator of FIG. 8.
Figure 12B:
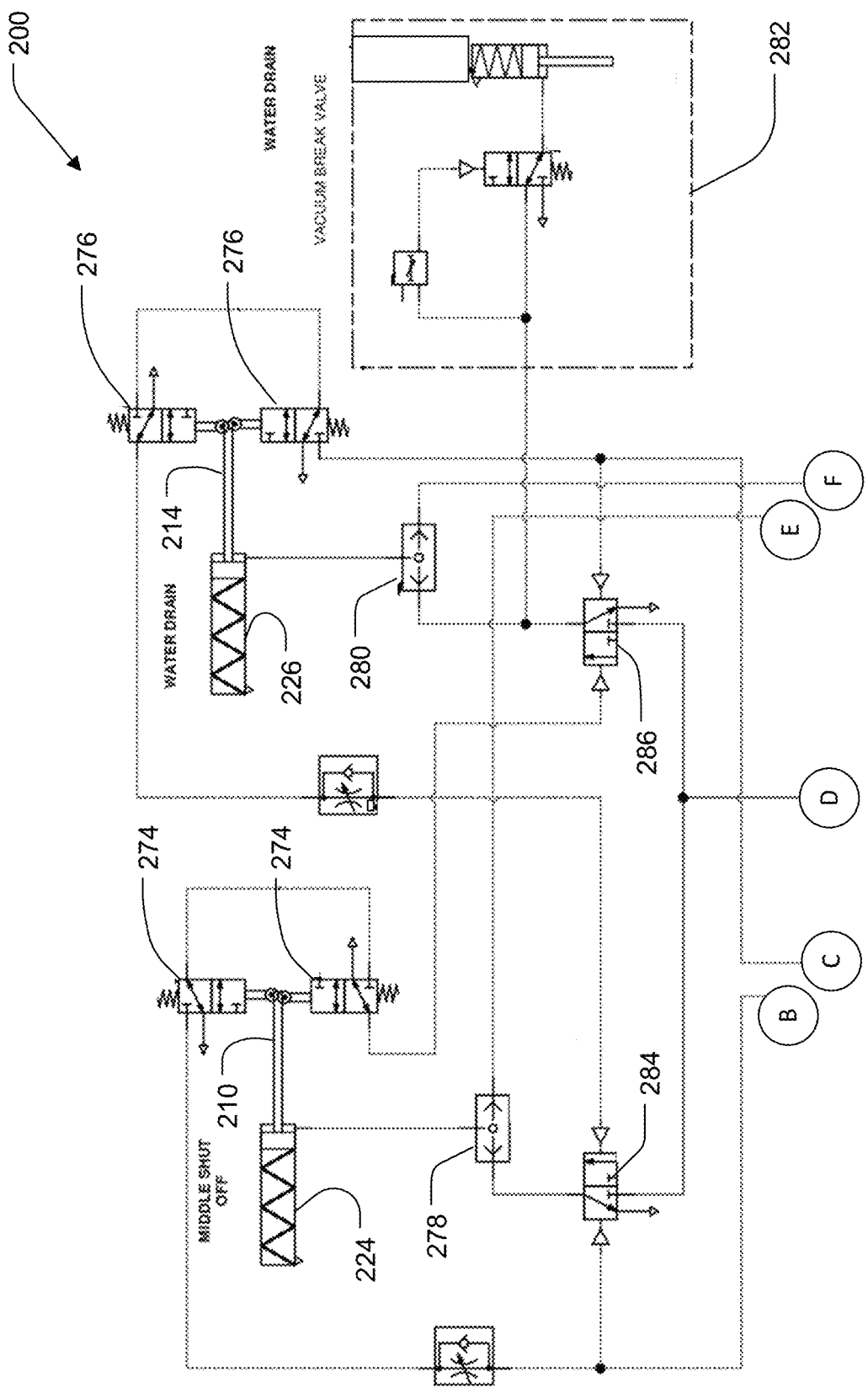
Figure 12C:
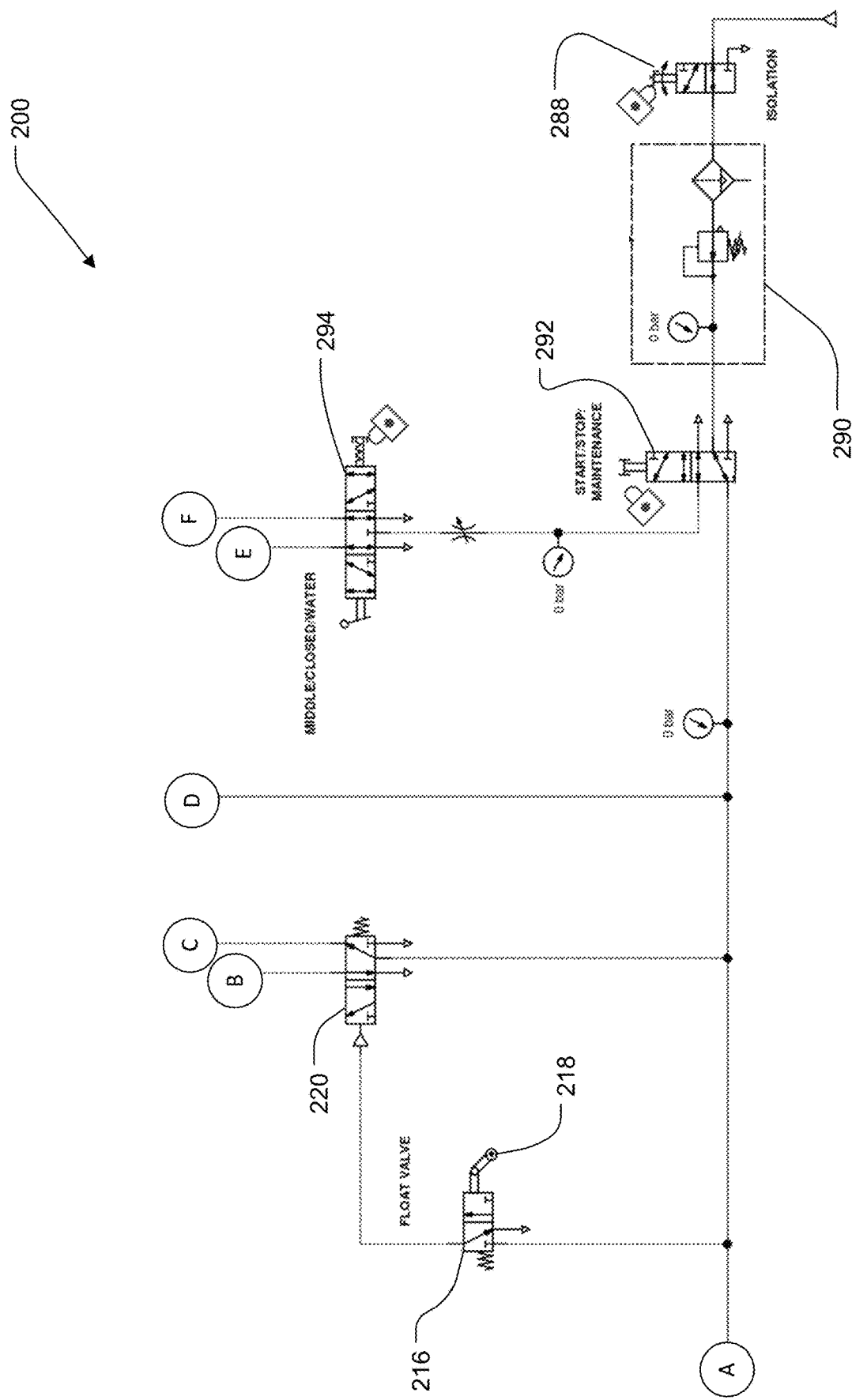

Referring generally to FIGS. 8 to 11, as well as 12A to C, an alternative embodiment of a separator 200 suitable for separating a liquid from a fluid stream is provided, where the fluid stream includes a mixture of gas and liquid. FIGS. 12A to C show an arrangement of a pneumatic system to control the separator 200. The separator 200 shares many similarities to the separator 100 and may be used as the separator 100 is used, however a top vessel of the separator 200 is elongate in a substantially horizontal direction, compared to the vertical direction of the first vessel 102. The separator 200 may comprise a first vessel 202 including an outlet 204, the outlet in fluid communication with a source of pressure. For example, the source of pressure may be negative pressure (suction) or the source of pressure may be positive pressure from the pressurised seam in an underground coal mine. The separator further includes an inlet 206 for receiving the fluid stream. The first vessel 202 may be arranged in fluid communication with a second vessel 208 via a first valve 210.

A fluid stream is directed into the inlet 206 from a supply of fluid. The second vessel 208 may be arranged in fluid communication with a liquid outlet 212 via a second valve 214, wherein the first vessel 202 is arranged to enable drainage of the liquid into the second vessel 208. The first vessel 202 is shown located above the second vessel 208, but may also be located adjacent to the first vessel 202.

As with the separator 100, the separator 200 has a number of valves. The first valve 210 and the second valve 214 may be interlocked to prevent both valves from opening at the same time. That is, the valves may be arranged in a first state with the first valve 210 open when second valve 214 is closed. The valves may be arranged in a second state where the first valve 210 may be closed when second valve 214 is open. The valves are arranged to open sequentially so that the one valve must close before the other valve may open. As with the separator 100, such an arrangement ensures that only one of the first valve 210 and the second valve 214 may be open during operation of the separator 200.

The second vessel 208 may include a switch 216 connected to and operated by a liquid level sensor, such as a float sensor 218, that detect an upper threshold of liquid and lower threshold of liquid in the second vessel 208. The switch 216 may close the second valve 214 when the lower threshold is detected and open the second valve 214 when the upper threshold is detected. As with the separator 100, the upper threshold may be set for when the second vessel 208 is approximately 95% full and the lower threshold may be set to approximately 5% full. Alternatively the upper threshold may be within 85% and up to 100%, while the lower threshold may be in the range of 0% to 15%. The float sensor 218 may be located at, or proximate, the liquid outlet 212 with the lower threshold set for the liquid level to be just above the top of the liquid outlet 212 to prevent gas from escaping the second vessel 208. As with the separator 100, the upper and lower thresholds may vary dynamically depending on a flowrate into the first vessel 202 or may also vary depending on the flowrate into the second vessel 208.

As described above, FIGS. 12A to 12C show a pneumatic control circuit for the separator 200. Although described in relation to the separator 200, some or all aspects of the pneumatic control circuit may also be applied to the separator 100. The circuit spans the FIGS. 12A to 12C with connections labelled, such as connection A-A between FIGS. 12A and 12C, or connections B-B, C-C, D-D, E-E and F-F between FIGS. 12B and 12C. The pneumatic circuit has an isolation valve 288 that may be used during maintenance to lock the separator 200 from operating. After the isolation valve 288 is a filter/regulator 290 before leading to a start/stop valve 292, which may be operated by a manual push button, used to control operation of the separator 200. The start/stop valve 292 is shown in the operating, or start, position. When in the stop position, the start/stop valve 292 connects the input to a selector valve 294 that has three position: middle, closed or water. When in the middle position, the selector valve 294 will open the first valve 210. In the close position, the first valve 210 and the second valve 214 will be closed, while in the water position, the selector valve 294 will open the second valve 214, allowing water to drain from the second vessel 208. The selector valve 294 may be used when the start/stop valve 292 is in the stop, or maintenance, position.

When the start/stop valve 292 is in the start position, the switch 216 will be operated by the float sensor 218 as described above. The switch 216 will operate pneumatic control valve 220 to switch between allowing the first valve 210 or the second valve 214 to open. When the switch 216 is activated by the float sensor 218, then the pneumatic control valve 220 moves to a position where first valve roller lever valves 274 are brought into the circuit. If the first valve 210 is closed by a first pneumatic cylinder 224, a second interlock valve 286 moves to a position allowing a second OR valve 280 to operate a second pneumatic cylinder 226 to open the second valve 214 and release liquid from the second vessel 208. The first valve roller lever valves 274 ensure that the second interlock valve 286 cannot operate until the first valve 210 is in the closed position. The pneumatic line between the second interlock valve 286 and the second OR valve 280 has a vacuum break valve 282 attached to control the air pressure in the line.

When the second valve 214 is opened by the second OR valve 280, air pressure is also provided to the vacuum break valve 282. The vacuum break valve 282 allows gas to enter the second vessel 208 while liquid is draining to assist with flow of liquid from the second vessel 208. The vacuum break valve 282 operates on a pneumatic timer that may be set for approximately the time taken for the second vessel 208 to drain. The pneumatic timer shuts the vacuum break valve 282 independently of the operational state of the second interlock valve 286, for example if there is a problem such as the second valve 214 being stuck open.

When the switch 216 is inactive, the pneumatic control valve 220 moves to a position bringing second valve roller lever valves 276 into the circuit. When the second valve 214 is closed by a second pneumatic cylinder 226, a first interlock valve 284 moves to position allowing a first OR valve 278 to operate the first pneumatic cylinder 224 to open the second valve 214. The second valve roller lever valves 276 ensure that the first interlock valve 284 cannot operate until the second valve 214 is in the closed position. Both the first OR valve 278 and the second OR valve 280 may vent the first pneumatic cylinder 224 or the second pneumatic cylinder 226, respectively, to the selector valve 294 when the selector valve 294 is in the closed position.

In one embodiment, the first vessel 202 includes at least one nozzle (not shown), The at least one nozzle receives fluid into the first vessel 202 through the inlet 206. The at least one nozzle may be arranged to direct the fluid stream to the first valve 210 and the shape of the at least one nozzle may vary depending on properties of the fluid received by the separator 200. The nozzle may include a curved section to direct the fluid towards the second vessel 208 and may have similar arrangements to the at least one nozzle 128 of the separator 100.

The first vessel 202 is shown with an elongate cylindrical shape with a first end 230 and a second end 234. The second vessel 208 is also shown with an elongate cylindrical shape with a first end 236 and a second end 238. Both the first vessel 202 and the second vessel 208 are elongate in a horizontal direction. While the two vessels are shown being parallel, alternative arrangements are also possible. In one embodiment, the first vessel 202 and the second vessel 208 may be horizontal but at an angle to each other so that the separator 200 may form an x shape when viewed from above with varying angles between the first vessel 202 and the second vessel 208. In one embodiment the first vessel 202 and the second vessel 208 are at 90 degrees. Alternatively the first vessel 202 and second vessel 208 may be at an angle of 45 degree. Alternatively the first vessel 202 and the second vessel 208 may be T shaped, with either the first end 230 of the first vessel 202 being located above the first valve 210 or the second end 234 being located above the first valve 210. In another alternative, the first vessel 202 may have a slight incline from each end towards the first valve 210 to assist in flow of any liquid to the second vessel 208. In such an arrangement the first vessel 202 may be tapered from one or each end. Other modifications to the vessels described above in relation to the separator 100, such as baffles in the vessels, may also be used.

The separator 200 may also use a base frame 240 having an arrangement of intersecting struts on which the second vessel 208 rests. The base frame 240 may also include engagement portions, such as hollow struts 242 that allow machinery to move the separator 200. For example, forks of a forklift truck may engage with the hollow struts 242 to allow the separator 200 to be moved by the forklift truck.

The valves used for the separator 200 may be of any type as described above in relation to the separator 100. Although not described in relation to the separator 200, the valves of the separator 200 may operate in a manner as described above for the valves of the separator 100.

Returning to the pneumatic circuit of FIGS. 12A to 12C, operation of a third and fourth valve will now be described with particular reference to FIG. 12A. The third and fourth valves are optional and are not shown on the separator 200 of FIGS. 8 to 11. A third valve 264 may be fitted to the separator 200 to control the outlet 204 using a third pneumatic cylinder 268. A fourth valve 270 may also be fitted to the separator 200 to control the inlet 206 and driven by a fourth pneumatic cylinder 272. The third valve 264 and the fourth valve 270 may be isolated from the pneumatic circuit using gas isolation 248. When isolated, the third valve 264 and the fourth valve 270 will close due to spring loading. When not isolated, the operation of the third valve 264 may be controlled by a pressure switch 244 and a pressure switch 246. The pressure switch 246 and pressure switch 244 operate together to close third valve 264 and trigger an alarm 252 with an audible warning sounding, such as an air horn. When pressure is at an acceptable level the alarm 252 is silenced and the third valve 264 is open by operating a valve 250. In one example, the pressure switch 244 and pressure switch 246 may work to detect negative or suction pressure supplied to the outlet 204. When pressure at the outlet 204 is outside a desired operating pressure range the third valve 264 is closed by the pressure switch 246. The pressure switch 244 may open the third valve 264 when the pressure reaches a lower level. The pressure switch 244 and pressure switch 246 may combine to operate in a similar manner to the pressure sensor 166 as described above.

As described above, the third valve 264 and fourth valve 270 are optional. In one embodiment there may only be one valve, such as the fourth valve 270, to isolate the separator 200 from a pressure source. In another embodiment, only third valve 264 may be used. In another embodiment, both the third valve 264 and the fourth valve 270 may be used, for example if there was a backfeed of other pipes in the network. In such an embodiment the pressure switch 244 and the pressure switch 246 may open and close both valves at the same time. The pressure switches may be set at a predetermined value by an end user, for example if an allowable pressure in the separator 200 was 50 kpa the pressure switch 246 may be set to operate at 45 kpa to close the third valve 264 and the fourth valve 270. The pressure switch 244 may be set at approximately 10 kpa so the valves open when pressure in the first vessel 202 is reaches 10 kpa.

In some embodiments, the fourth valve 270 may be manually operated by a user using a hand wheel or with additional pneumatic circuitry, not shown. The fourth valve 270 may also be operated using pressure switches. In one embodiment a pressure sensor inside the separator 200 may be used to close the fourth valve 270. The fourth valve 270 may operate in a similar manner to the fourth valve 170 described above. Typically, the fourth valve 270 operates independently to the other valves. Both the third valve 264 and the fourth valve 270 are biased to a close position by a spring so that both valves close in the event of a loss of pneumatic pressure. The first valve 210 and the second valve 214 may also be spring loaded and close when pneumatic pressure is lost.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "above" and "below" and the like are used as words of convenience to provide reference points and are not to be construed as limiting terms.

Optional embodiments may also be said to broadly include the parts, elements, steps and/or features referred to or indicated herein, individually or in any combination of two or more of the parts, elements, steps and/or features, and wherein specific integers are mentioned which have known equivalents in the art to which the invention relates, such known equivalents are deemed to be incorporated herein as if individually set forth.

Although a preferred embodiment has been described in detail, it should be understood that modifications, changes, substitutions or alterations will be apparent to those skilled in the art without departing from the scope of the present invention.

Throughout this specification and the claims which follow, unless the context requires otherwise, the word "comprise", and variations such as "comprised", "comprises" or "comprising", will be understood to imply the inclusion of a stated integer or step or group of integers or steps but not the exclusion of any other integer or step or group of integers or steps.

As used herein, a, an, the, at least one, and one or more are used interchangeably, and refer to one or to more than one (i.e. at least one) of the grammatical object. By way of example, "an element" means one element, at least one element, or one or more elements.

In the context of this specification, the term "about" is understood to refer to a range of numbers that a person of skill in the art would consider equivalent to the recited value in the context of achieving the same function or result.

Advantages

The embodiments described herein provide a novel means of automatically separating liquid and gas in an environment where electrical systems are limited or not permitted.

Further, the separator is designed to improve the safety of current non-electrical separators by such features as, self-closing valves in the event of a loss of pneumatic pressure or suction for gas extraction and various pressure relief valves to prevent an overload of pressure. These safety features greatly reduces the danger to mine workers and enables automatic operation that reduces labour cost.

Further, as the separator is pneumatically operated, the separator is able to be used in new areas of the mine where electricity has not been provided such that mine workers undertaking exploratory tasks are able to begin the degasification process very early in the coal seam life-cycle in a safe and efficient manner. This provided more complete draining before the cutting of the coal is to begin. The pneumatically operated separator may also be used in hazardous environments where possible sparks from electrical equipment could cause gasses to ignite.

The first and second valves, as described above, have an interlocking operation where one valve must be closed before the other valve may open. When in operation, only one of the valves may be open. Such an arrangement allows for liquid to be removed from the second vessel without disturbance from liquid entering from the first vessel to the second vessel, In such an arrangement the second valve is open and the first valve is closed. As liquid is discharged from the second vessel, the first valve prevents liquid flowing from the first vessel to the second vessel. The first vessel acts as temporary storage for the liquid. Once the outlet of the second vessel is closed, by the second valve, the first valve may open to allow liquid to flow from the first vessel to the second vessel.

The claims defining the invention are as follows:

1. A separator for separating liquid from a fluid stream including a mixture of gas and liquid, comprising;
    a first vessel including an outlet and an inlet for receiving the fluid stream, said first vessel in fluid communication with a second vessel via a first valve, the second vessel including a liquid outlet, wherein the second vessel is in fluid communication with the liquid outlet via a second valve,
    wherein the first vessel is arranged to enable the liquid from the mixture of gas and liquid to flow into the second vessel; and
    wherein in the second valve controls the release of liquid from the second vessel, the first and second valves being pneumatically operated, the pneumatic operation of the first and second valves allowing only one of the first and second valves to be open during operation of the separator;
    wherein the second vessel includes a liquid sensor arranged to detect an upper threshold of liquid and a lower threshold of liquid in the second vessel and wherein the liquid sensor is arranged to close the first valve upon detection of the upper threshold of liquid and the first valve includes a first valve sensor, wherein the first valve sensor is arranged to detect when the first valve is fully closed and send a signal to open the second valve, wherein the liquid sensor is arranged to close the second valve upon detection of the lower threshold of liquid, and
    wherein the lower threshold of liquid is set where the liquid in the second vessel is filled to approximately 5% to approximately 15% of a total volume of the second vessel.

2. The separator in accordance with claim 1, wherein the separator is arranged in a first state, where the first valve is open and the second valve is closed.

3. The separator in accordance with claim 1, wherein the separator is arranged in a second state, where the second valve is open and the first valve is closed.

4. The separator in accordance with claim 1, wherein the second valve includes a second valve sensor, wherein the second valve sensor is arranged to detect when the second valve is fully closed and send a signal to open the first valve.

5. The separator in accordance with claim 1, wherein the liquid sensor includes a float sensor which is provided at or proximate to the liquid outlet whereby the lower threshold is provided above the liquid outlet.

6. The separator in accordance with claim 1, wherein the liquid sensor operates a switch, wherein the switch is arranged to control a pneumatic control valve arranged in pneumatic connection with a first pneumatic cylinder arranged to articulate the first valve and wherein the pneumatic control valve is also arranged in pneumatic connection with a second pneumatic cylinder arranged to articulate the second valve.

7. The separator in accordance with claim 6, wherein upon detection of the upper threshold of liquid, the pneumatic control valve controls a pneumatic pressure in a first direction to move the separator from the first state to the second state and wherein upon detection of the lower threshold of liquid, the pneumatic control valve controls the pneumatic pressure in a second direction such that the separator moves from the second state to the first state.

8. The separator in accordance with claim 7, wherein the first direction of pneumatic pressure is opposite to the second direction of pneumatic pressure.

9. The separator in accordance with claim 1, wherein the separator further includes a third valve arranged to locate between the first vessel and the outlet, wherein the first vessel includes a pressure sensor in connection with a third pneumatic cylinder arranged to articulate the third valve, such that upon the pressure sensor detecting a pressure outside a desired pressure range, the third pneumatic cylinder closes the third valve.

10. The separator in accordance with claim 9, wherein the third valve is a pneumatically operated valve selected from the group consisting of a knifegate valve, a ball valve and a butterfly valve.

11. The separator in accordance with claim 9, wherein the third valve includes a bias mechanism to bias the third valve closed in the event of a loss of pneumatic pressure.

12. The separator in accordance with claim 1, wherein the first vessel includes at least one nozzle, the at least one nozzle being arranged to receive the fluid stream from the inlet and direct the fluid stream into the first vessel.

13. The separator in accordance with claim 1, wherein the separator further includes a fourth valve arranged to locate between the first vessel and the inlet, wherein the fourth valve is a pneumatically operated valve selected from the group consisting of a knifegate valve, a ball valve and a butterfly valve, and wherein the fourth valve includes a bias mechanism to bias the fourth valve closed in the event of a loss of pneumatic pressure.

14. The separator in accordance with claim 1, wherein the first vessel and the second vessel are elongate shaped, and wherein the first vessel is elongate in a substantially vertical direction and the second vessel is elongate in a substantially horizontal direction.

15. The separator in accordance with claim 14, wherein the first vessel is cylindrically shaped at a first end includes a tapered second end, the second end being in fluid connection with the second vessel via the first valve and wherein the second vessel is cylindrically shaped and the second valve is arranged to locate at either a first end or a second end of the second vessel.

16. The separator in accordance with claim 1, wherein the first vessel and the second vessel are elongate shaped the first vessel is elongate in a substantially horizontal direction and the second vessel is elongate in a substantially vertical direction.

17. The separator in accordance with claim 1, wherein each of the first valve and the second valve are a pneumatically operated valve selected from the group consisting of a knifegate valve, a ball valve and a butterfly valve, wherein the first valve including a first pneumatic cylinder arranged to articulate the first valve, the first pneumatic cylinder arranged to bias the first valve in a closed position, and wherein the first valve and the second valve each include a bias mechanism to respectively bias the first valve and the second valve closed in the event of a loss of pneumatic pressure.

* * * * *